United States Patent [19]

Chikuma et al.

[11] Patent Number: 5,508,921
[45] Date of Patent: Apr. 16, 1996

[54] FOUR WHEEL STEERING APPARATUS

[75] Inventors: Isamu Chikuma; Hiroshi Eda; Hiroyuki Kanou, all of Maebashi; Nobuyasu Ando; Kaoru Kiyono, both of Takasaki, all of Japan

[73] Assignee: NSK, Ltd., Tokyo, Japan

[21] Appl. No.: 470,572

[22] Filed: Jun. 7, 1995

Related U.S. Application Data

[63] Continuation of Ser. No. 813,516, Dec. 26, 1991, abandoned.

[30] Foreign Application Priority Data

| Jan. 10, 1991 | [JP] | Japan | 3-003321 U |
|---|---|---|---|
| Jul. 12, 1991 | [JP] | Japan | 3-062201 U |
| Jul. 12, 1991 | [JP] | Japan | 3-062202 U |
| Jul. 15, 1991 | [JP] | Japan | 3-062468 U |
| Jul. 15, 1991 | [JP] | Japan | 3-062469 U |

[51] Int. Cl.$^6$ .............................................. B60K 17/34
[52] U.S. Cl. ................. 364/424.05; 280/91; 180/79.1; 180/142
[58] Field of Search .................. 364/424.05; 180/79, 180/79.1, 140, 142, 143, DIG. 3; 280/91

[56] References Cited

U.S. PATENT DOCUMENTS

| 4,527,316 | 2/1986 | Kanazawa et al. | 180/143 |
|---|---|---|---|
| 4,657,102 | 4/1987 | Kanazawa et al. | 180/140 |
| 4,719,981 | 1/1988 | Miyoshi | 180/140 |
| 4,741,409 | 5/1988 | Westercamp et al. | 180/79.1 |
| 4,828,064 | 5/1989 | Furutani et al. | 180/140 |
| 4,903,208 | 2/1990 | Murai et al. | 364/424.05 |
| 4,926,955 | 5/1990 | Ohmura et al. | 180/140 |
| 4,930,592 | 6/1990 | Ohmura | 180/79.1 |
| 4,961,144 | 10/1990 | Yabe et al. | 364/424.05 |
| 5,014,801 | 5/1991 | Hirose | 180/140 |
| 5,018,594 | 5/1991 | Takahashi et al. | 180/140 |
| 5,048,627 | 9/1991 | Eguchi et al. | 180/140 |
| 5,048,629 | 9/1991 | Abe et al. | 180/140 |
| 5,068,584 | 11/1991 | Herent et al. | 318/549 |
| 5,101,922 | 4/1992 | Ohmura | 180/79.1 |
| 5,161,106 | 11/1992 | Shiraishi et al. | 364/424.05 |
| 5,189,616 | 2/1993 | Tsurumiya et al. | 364/424.05 |
| 5,200,911 | 4/1993 | Ishikawa et al. | 364/578 |

FOREIGN PATENT DOCUMENTS

| 0331204 | 9/1989 | European Pat. Off. |
|---|---|---|
| 57-99470 | 6/1982 | Japan |
| 58-214469 | 12/1983 | Japan |
| 58-214470 | 12/1983 | Japan |

OTHER PUBLICATIONS

Patent Abstracts of Japan, vol. 14, No. 251 (M–979) 29 May 1990.

*Primary Examiner*—Kevin J. Teska
*Assistant Examiner*—Leigh Marie Garbowski
*Attorney, Agent, or Firm*—Shapiro and Shapiro

[57] ABSTRACT

A four-wheel steering apparatus comprises a front wheel steering angle sensor for detecting the steering angles given to the front wheels, a vehicle speed sensor for detecting vehicle speeds, a rear wheel output shaft for giving steering angles to the rear wheels by being displaced it in the axial direction, a centering spring having the resiliency enabling the rear wheel output shaft to be returned to the neutral position, an electric motor for causing the rear wheel output shaft to be displaced in the axial direction against the resiliency of the centering spring, and a controller for controlling the energizing of the electric motor on the basis of the signals from the front wheel steering sensor and vehicle speed sensor, the controller adjusting the output torque of the electric motor on the basis of the signals from the front wheel steering sensor and vehicle speed sensor to control the rear wheel output shaft to be displaced for a desired amount by open loop control.

5 Claims, 11 Drawing Sheets

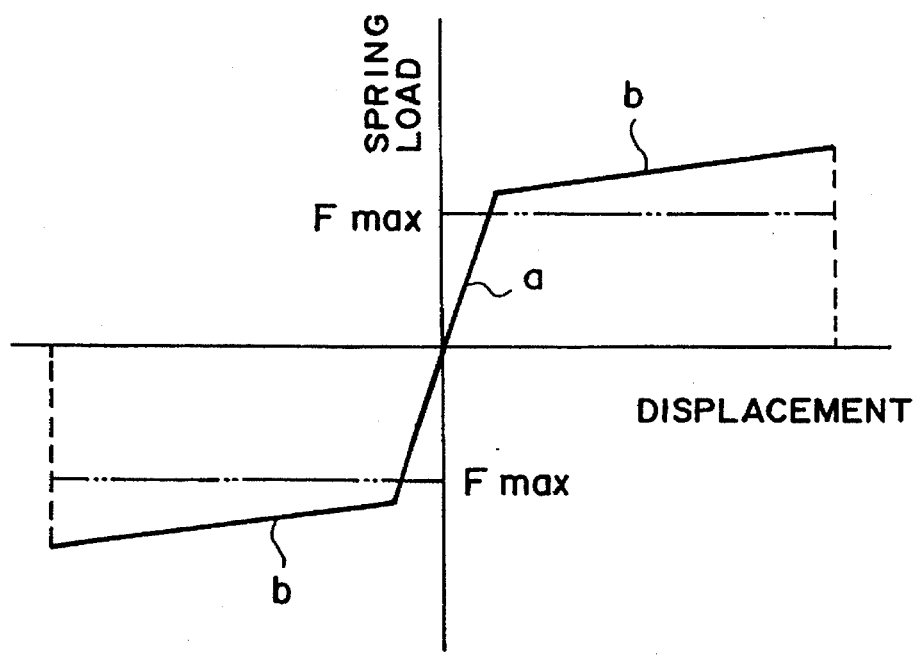
F I G. 12
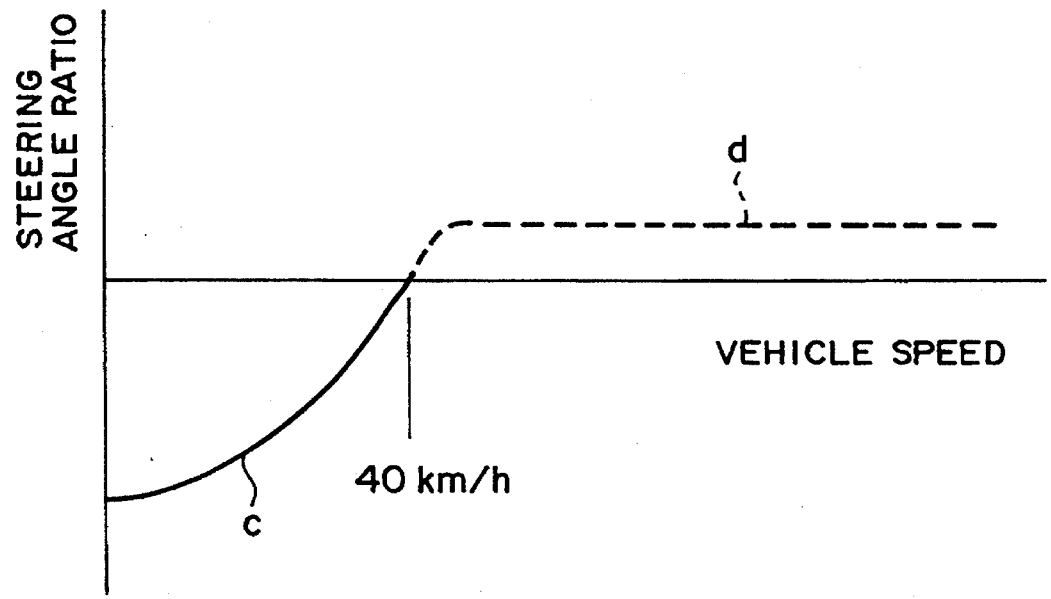
F I G. 13

FOUR WHEEL STEERING APPARATUS

This is a continuation of application Ser. No. 07/813,516 filed Dec. 26, 1991, now abandoned.

BACKGROUND OF THE INVENTION

1. Field of the Invention

The present invention relates to a four-wheel steering apparatus which is utilized as a steering apparatus for an automobile to make its turning radius smaller or to maintain its traveling stability by changing not only the direction of the front wheel, but also the direction of the rear wheel when the automobile changes its driving lane or turns.

2. Related Background Art

In order to turn with ease in a narrow road, the turning radius of an automobile should be small. Also, the stability of the automobile should be maintained in changing lanes at a high-speed driving. To these ends, there has been in use in recent years a four-wheel steering apparatus whereby not only the front wheels, but also the rear wheels are moved when the steering wheel is operated.

In a conventionally known four-wheel steering wheel apparatus, the structure is provided with a front wheel steering angle detecting sensor for detecting steering angles given to the front wheels, a vehicle speed sensor for detecting vehicle speeds, a rear wheel output shaft for giving steering angles to the rear wheels by displacing itself in the axial direction, a rear wheel steering angle detecting sensor for detecting the rear wheel steering angles on the basis of the displacement of the rear wheel output shaft, an electric motor for causing the aforesaid rear wheel output shaft to be displaced over the axial direction, and a controller for controlling the energizing of this motor in response to the signals from each of the aforesaid sensors.

When steering angles are given to the rear wheels, the controller determines the steering angles on the basis of the signals form the front wheel steering angle sensor and the vehicle speed sensor and at the same time, energizes the aforesaid electric motor to cause the rear wheel output shaft to be displaced over the axial direction, thus giving the required steering angles to the rear wheels.

The steering angles thus given to the rear wheels are detected by the aforesaid rear wheel steering angle sensor. Then, the signals indicating the rear wheel angles are transmitted to the aforesaid controller. Thus, the controller controls the energizing of the electric motor so that the aforesaid rear wheel output shaft is stopped as it is while maintaining the state where the steering angles given to the rear wheels have reached the desired value. In other words, the aforesaid controller utilizes the signals from the rear wheel steering angle sensor as feedback signals to perform the so-called closed loop control of the aforesaid electric motor.

However, in the case of the conventional four-wheel steering apparatus which is structured to function as above, a plurality of the rear wheel steering angle sensors are needed including those to be used for fail-safe in order to allow the controller to perform the closed loop control of the electric motor. Accordingly, the structure becomes more complicated, hence unavoidably increasing the manufacturing cost of the apparatus.

In Japanese Patent Application Laid-Open No. 57-99470, Japanese Patent Application Laid-Open No. 58-214469, and Japanese Patent Application Laid-Open No. 58-214470, there are disclosed techniques to perform the so-called open control of the rear wheel steering angles in a four-wheel steering apparatus, in which steering angles are given to the rear wheels by a hydraulic cylinder or a pneumatic cylinder, without utilizing the operation of providing the rear wheels with appropriate steering angles in relation to the steering angles given to the front wheels as any feedback signals.

Nevertheless, in the case where a hydraulic cylinder or pneumatic cylinder is employed, a pump or compressor is required for providing hydraulic pressure or compressed air for steering the wheel and pipings are needed to supply the compressed air or hydraulic pressure, leading also to the unavoidable increase of the manufacturing cost of the apparatus.

When actually mounting in an automobile an electric four-wheel steering apparatus which provides the rear wheels with steering angles by the use of an electric motor such as disclosed in Japanese Patent Application No. 2-235553, it is preferable to enhance its safety in view of the points given below.

In the above-mentioned electric four-wheel steering apparatus, if a steering angle is given to the front wheels when the vehicle is driving at low speeds, a control is performed in order to make the turning radius of the vehicle smaller by providing the rear wheels with a steering angle in a direction opposite to the front wheels.

However, in a case where the vehicle speed sensor itself is damaged or the connecting wiring between the vehicle speed sensor and the controller is cut or some other malfunctions are caused to provide the controller with an information that the vehicle speed is zero (0 km/h) despite the vehicle is still in traveling, if a steering angle is given to the front wheels at that time, the rear wheels are still provided with a steering angle in the direction opposite to the front wheels even when the vehicle is traveling at high speeds.

Thus, there is a problem encountered in that the vehicle stability cannot be maintained sufficiently if steering angles are given to the rear wheels in the direction opposite to the front wheels when the vehicle is traveling at high speeds.

Also, in the above-mentioned electric four-wheel steering apparatus, a steering angle is given to the rear wheels with respect to a steering angle to the front wheels irrespective of the capacity of a battery when the steering angle is given to the front wheels.

Because the electric motor for providing the rear wheels with steering angles consumes a fairly large amount of electricity, if steering angles are given to the rear wheels while the battery capacity is not good enough, the capacity of the aforesaid battery becomes increasingly less, and there is a possibility that the vehicle driving can be hindered due to the inability of actuating the self-starting motor or the like when the vehicle is restarted after a stop.

Also, in a structure where no centering springs are provided to give bias to the rear wheels to return to the neutral position, if the battery is completely consumed in a state that a steering angle is still applied to the rear wheels, there is a possibility that the rear wheels remain with a steering angle being applied.

SUMMARY OF THE INVENTION

It is an object of the present invention to provide a four-wheel steering apparatus which can be manufactured at a comparatively low cost and with a simple structure of the apparatus itself.

It is another object of the present invention to provide a four-wheel steering apparatus capable of performing fine adjustments of the rear wheel steering angles in traveling at high vehicle speeds.

It is still another object of the present invention to provide a four-wheel steering apparatus capable of making flexible changes in the controlling intensity required for the rear wheel steering with respect to the changes in members with passage of time and hysteresis characteristics.

It is a further object of the present invention to provide a four-wheel steering apparatus which can be operated safely even if a trouble occurs in its circuitry.

A four-wheel steering apparatus according to the present invention is provided with a front wheel steering angle sensor for detecting steering angles given to the front wheels, a vehicle speed sensor for detecting vehicle speeds, a rear wheel output shaft for giving steering angles to the rear wheels by being displaced in the axial direction, a centering spring having resiliency to enable the rear wheel output shaft to be returned to the neutral position, an electric motor for causing the aforesaid rear wheel output shaft to be displaced over the axial direction against the resiliency of the centering spring, and a controller for controlling the energizing of the aforesaid electric motor in response to the signals from the aforesaid front wheel steering angle sensor and vehicle speed sensor, and this controller adjusts the output torque of the electric motor to a desired value on the basis of the signals transmitted thereto form the front wheel steering angle sensor and vehicle speed sensor to perform an open loop control so that the aforesaid rear wheel output shaft is controlled to displace it by a desired amount.

In the four-wheel steering apparatus structured as above, the controller determines the degree of a steering angle to be given to the rear wheels on the basis of the signals from the front wheel steering angle sensor and vehicle speed sensor when a steering angle is given to the rear wheels and then, determines the output torque of the electric motor required for displacing the rear wheel output shaft against the resiliency of the centering spring in accordance with the amount of the displacement of the rear wheel output shaft required for giving the steering angle to the rear wheels, thus allowing a desired amount of current to be supplied to the electric motor for the provision of the desired steering angle to the rear wheels.

A four-wheel steering apparatus according to the present invention is provided with a front wheel steering angle sensor for detecting steering angles given to the front wheels, a vehicle speed sensor for detecting vehicle speeds, a rear wheel output shaft for giving steering angles to the rear wheels by displacing itself in the axial direction, a centering spring having resiliency to enable the rear wheel output shaft to be returned to the neutral position, an electric motor for causing the aforesaid rear wheel output shaft to be displaced over the axial direction against the resiliency of the centering spring, and a controller for controlling the energizing of the aforesaid electric motor in response to the signals from the aforesaid front wheel steering angle sensor and vehicle speed sensor, and this controller calculates the target value of a steering angle to be given to the rear wheels on the basis of the signals from the front wheel steering angle sensor and vehicle speed sensor and adjusts the output torque of the electric motor to a desired value in order to control the rear wheel output shaft with the open loop control to displace it by a desired amount for providing the rear wheels with the steering angle corresponding to this target value.

Furthermore, in the four-wheel steering apparatus of the present invention, the spring characteristic of the aforesaid centering spring is made non-linear so that the spring constant of this centering spring is large in a region where the resilient deformation thereof is small whereas the spring constant is small in a region where the resilient deformation is large.

In a four-wheel steering apparatus according to the present invention as structured above, when the resilient deformation of the centering spring is small due to the small steering angle given to the rear wheels, the spring constant of the centering spring becomes large so that the resiliency of the centering spring changes greatly even by fine changes in the steering angles. Accordingly, fine adjustments can be made easily for the steering angles given to the rear wheels.

Also, when the steering angle given to the rear wheels is large and the resultant resilient deformation of the centering spring is great, the spring constant of the centering spring becomes small so that the resiliency of the centering spring is not made too large even if the steering angle is changed greatly. As a result, it is not required to make the force required for resiliently deforming the centering spring unnecessarily great.

As in the aforesaid conventional electric four-wheel steering apparatus, the four-wheel steering apparatus of the present invention also comprises a front wheel steering angle sensor for detecting the steering angles given to the front wheels, a controller for calculating the steering angles to be given to the rear wheels on the basis of the signals from this front wheel steering angle sensor to output instruction signals in accordance with the result of the calculation thus performed, and an electrically driven actuator for giving the steering angles to the rear wheels in response to the instruction signals.

Further, in the four-wheel steering apparatus of the present invention, a vehicle speed sensor is provided to input the detecting signals from this vehicle speed sensor into the aforesaid controller. Then, the controller stops giving any steering angles to the rear wheels without regard to the detected value of the aforesaid front wheel steering sensor in a case where the vehicle is judged to be at rest on the basis of the signals from the aforesaid vehicle speed sensor, and is characterized by having a function to provide the rear wheels with the steering angles to be calculated on the basis of the signals transmitted from the aforesaid front wheel steering sensor by giving the steering angles to the rear wheels gradually when the vehicle is judged to be in motion again in accordance with the signals from the four-wheel steering sensor after the provision of the steering angles have been once suspended.

In the case of a four-wheel steering apparatus according to the present invention, which is structured as above, if the vehicle speed is judged to be zero, the provision of any steering angles to the rear wheels is completely suspended. Hence there is no possibility that any steering angles are given to the rear wheels in the direction opposite to the front wheels at the time of a high speed driving when the vehicle speed sensor should be damaged or the connecting wiring should be cut.

Then, in the case where there is no damage on the vehicle speed sensor or on the connecting wiring and the vehicle speed is actually zero, that is, the vehicle is at rest, the steering angles are gradually given to the rear wheels when the driving is resumed (the steering angles are not given abruptly as the driving is again started), thus avoiding any sense of incompatibility to be given to the driver.

An electric four-wheel steering apparatus according to the present invention comprises as in the case of the aforesaid conventional electric four-wheel steering apparatus a front wheel steering angle sensor for detecting the steering angles given to the front wheels, a controller for calculating the steering angles to be given to the rear wheels on the basis of the signals transmitted thereto from the front wheel steering sensor and for outputting the instruction signals in accordance with the result of such calculation, an electric actuator for giving the steering angles to the rear wheels in response to the instruction signals, and a battery for energizing the electric actuator.

Further, in the electric four-wheel steering apparatus of the present invention, source voltage detecting means is provided for detecting the voltage of the aforesaid battery to input the detected signals by this source voltage detecting means into the aforesaid controller. Then, this controller makes it possible to provide the rear wheels with a large steering angle if the voltage is high according to the signal transmitted from the aforesaid source voltage detecting means, which indicates the voltage of the above-mentioned battery, and to provide the rear wheels only with a small angle when the aforesaid voltage is low. Then, the controller is characterized by having a function to disable the provision of steering angles to the rear wheels when the aforesaid voltage is too low.

In the case of the electric four-wheel steering apparatus of the present invention, which is structured as above, if the voltage of the battery is low the consumption of the battery is prevented by making the steering angles given to the rear wheels small or not giving any steering angles to the rear wheels at all.

BRIEF DESCRIPTION OF THE DRAIWNGS

FIG. 12 is a diagram showing the relationship between the displacement of the rear wheel output shaft over the axial direction and the spring load exerted in the axial direction of the rear wheel output shaft;

FIG. 13 is a diagram showing the relationship between the vehicle speeds and the steering angles;

DESCRIPTION OF THE PREFERRED EMBODIMENTS

Hereinafter, in reference to the accompanying drawings, the embodiments according to the present invention will be described in detail.

Figure 1:
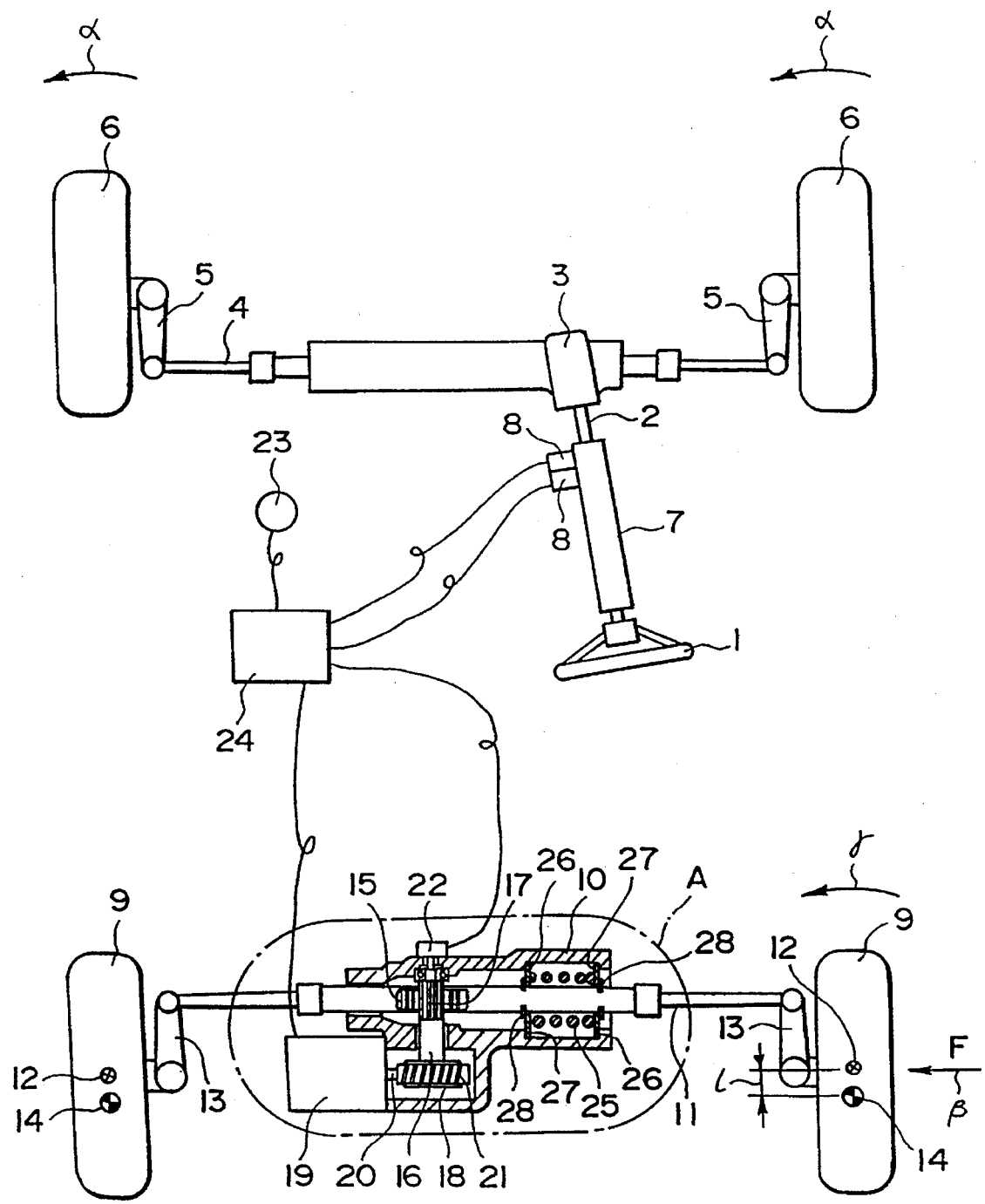
FIG. 1 is a horizontally cross-sectional view partially illustrating the entire structure of an embodiment according to the present invention.

As shown in FIG. 1, the operation of the steering wheel 1 provided with facing to the driver's seat is transmitted to a steering gear 3 through a steering shaft 2 to displace the front wheel output shaft 4 in the axial direction (to the left and right directions in FIG. 1), thus giving a desired steering angle to the front wheels 6 and 6 through a pair of the knuckle arms 5 and 5 each on the left and right side connected respectively to the both ends of this front output shaft 4.

On the steering column 7 through which the aforesaid steering shaft 2 penetrates, the front wheel steering angle sensors 8 and 8 are supported, and by the rotational angles detected by this front wheel steering angle sensors 8 and 8, the steering angles given to the front wheels 6 and 6 are freely detected. In this respect, the reason why the two front wheel steering sensors 8 and 8 are provided is that even if one of the front wheel steering sensor 8 should be damaged, desired controls are still possible by the other sensor, thus attaining the fail-safe.

Also, on the rear floor face of the vehicle, a housing 10 for accommodating a mechanism for giving steering angles to the rear wheels 9 and 9 is supported in such a manner that any displacement over the width direction of the vehicle (to the left and right directions in FIG. 1 and FIG. 2) is disabled. Then, through the inner side of this housing 10, the rear wheel output shaft 11 penetrates in the left and right directions (width direction of the vehicle). Along with the displacement in the axial direction (the left and right directions), this rear wheel output shaft 11 gives steering angles to the aforesaid rear wheels 9 and 9, and the both ends on the left and right sides of the rear wheel output shaft 11 and each of the rear wheels 9 and 9 are connected through knucle arms 13 and 13.

Then, along with the displacement of the aforesaid rear wheel output shaft 11 in the axial direction, each of the rear wheels 9 and 9 is rocked with the steering centers 14 and 14 as the center of rocking so that the steering angle corresponding to the displacement amount of the aforesaid rear wheel output shaft 11 is given to each of the rear wheels 9 and 9. Also, the steering centers 14 and 14 of the rear wheels 9 and 9 are positioned backwards (downwards in FIG. 1) in the traveling direction of the vehicle (upwards in FIG. 1) from the points of application force 12 and 12 (the center of contact area between the bottom face and ground) of the aforesaid rear wheels 9 and 9 by a distance l.

Figure 2:
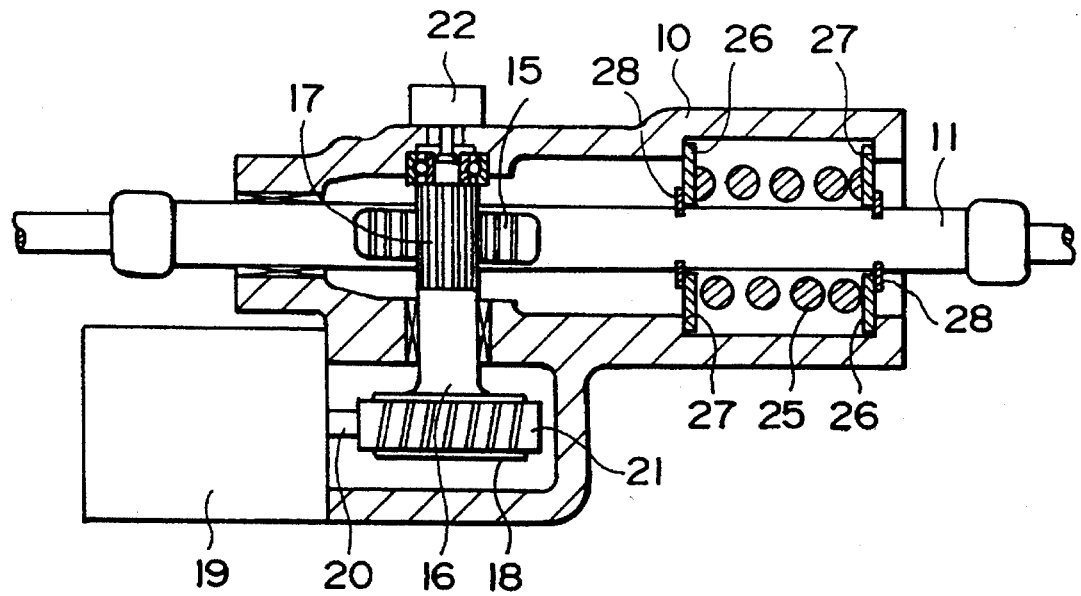
FIG. 2 is an enlargement of A section of FIG. 1.

As shown in FIG. 2 in detail, a rack 15 is fixedly provided in a portion of the intermediate portion of the aforesaid rear wheel output shaft 11 located inside the aforesaid housing 10. Also, a pinion 17 is fixedly provided at one end portion (upper end in FIG. 1 and FIG. 2) of the transmission shaft 16 which is rotatively supported in helically positional relationship with the aforesaid rear wheel output shaft 11 in the inner side of the aforesaid housing 10, and this pinion 17 is allowed to engage with the rack 15. Also, a worm wheel 18 is fixedly provided at the other end (lower end in FIG. 1 and FIG. 2) of the aforesaid transmission shaft 16.

Also, to the output shaft 20 of the electric motor 19 fixed on the outer face of the aforesaid housing 10, a worm 21 is fixedly mounted, and a speed reducing mechanism is constructed by allowing this worm 21 to engage with the worm wheel 18 to displace the aforesaid rear wheel output shaft 11 in the axial direction by the rotation of the aforesaid output shaft 20. This speed reducing mechanism should have reversibility in the power transmission direction. Thus, by the rotation of the aforesaid output shaft 20, this mechanism causes the rear wheel output shaft to be displaced in the axial direction. Conversely, by displacing the rear wheel output shaft 11 in the axial direction, the aforesaid output shaft 20 is caused to be rotated. However, because the reverse force transmission factor of the speed reducing mechanism is low, the load given by the compression of the centering spring 25 which will be described later is not added to the aforesaid electric motor 19 as it is.

At one end of the aforesaid transmission shaft 16, a displacement sensor 22 is provided to freely detect the displacement amount of the aforesaid rear wheel output shaft 11 through the transmission shaft 16. The detecting signals being transmitted from this displacement sensor 22 are inputted into a controller 24 which controls the energizing of the aforesaid electric motor 19 based on these signals together with the detecting signals from the aforesaid front wheel sensors 8 and 8 as well as the detecting signals from the vehicle speed sensor 23 which detects the speed of the vehicle. In this respect, the reason why the aforesaid displacement sensor 22 is provided is that when the displacement amount of the rear wheel output shaft 11 should be deviated from a desired value due to a trouble or the like occurring in the aforesaid controller 24, the fail-safe is attained by the function of this sensor.

Also, the aforesaid rear wheel output shaft 11 is supported with a slight displacing freedom in the axial direction (the left and right directions in FIG. 1 and FIG. 2) and also resiliently with respect to the aforesaid housing 10. More particularly on the intermediate portion of the aforesaid rear wheel output shaft 11, a pair of washer plates 26 and 26 are attached to the rear wheel output shaft 11 at intervals, being fitted thereto with a slight displacing freedom in the axial direction of the aforesaid rear wheel output shaft 11. Also there is provided between the inner faces of the both washer plates 26 and 26 the centering spring 25 having resiliency strong enough to cause the aforesaid rear wheel output shaft 11 to be returned to the neutral position when the aforesaid electric motor 19 should be in trouble.

Also, on the inner peripheral faces of the aforesaid housing 10, a pair of staged portions 27 and 27 are formed at intervals with each other, and the external peripheral portions of the outer side faces of the aforesaid pair of washer plates 26 and 26 are arranged to face the staged portions 27 and 27 respectively. Also, a pair of stop rings 28 and 28 are fixedly provided at positions sandwiching the aforesaid pair of washer plates 26 and 26 on the outer periphery of the intermediate portion of the aforesaid rear wheel output shaft 11 to restrict the movement of the each of the washer plates 26 and 26 with respect to the rear wheel output shaft 11.

As a result of the structure such as this, the aforesaid rear wheel output shaft 11 is returned to the neutral position by the resiliency of the aforesaid centering spring 25 absent an external force such as given by the aforesaid electric motor 19 being energized.

Furthermore, the aforesaid controller 24 adjusts the output torque of the aforesaid electric motor 19 to a desired value in response to the signals being transmitted from the aforesaid front wheel steering sensors 8 and 8 as well as from the vehicle speed sensor 23, and performs the controlling to displace the aforesaid rear wheel output shaft 11 by open loop control for the desired value.

In other words, along with the displacement of the aforesaid rear wheel output shaft 11 for the provision of a steering angle to the rear wheels 9 and 9, the aforesaid centering spring 25 is compressed and then a load W corresponding to the compressed amount of this centering spring 25 is added in the axial direction of the aforesaid rear wheel output shaft 11. The relationship between the displacement amount L (which is equal to the compressed amount of the centering spring 25) of the rear wheel output shaft 11 in this case and the load W of the centering spring 25 is represented as in FIG. 3.

Figure 3:
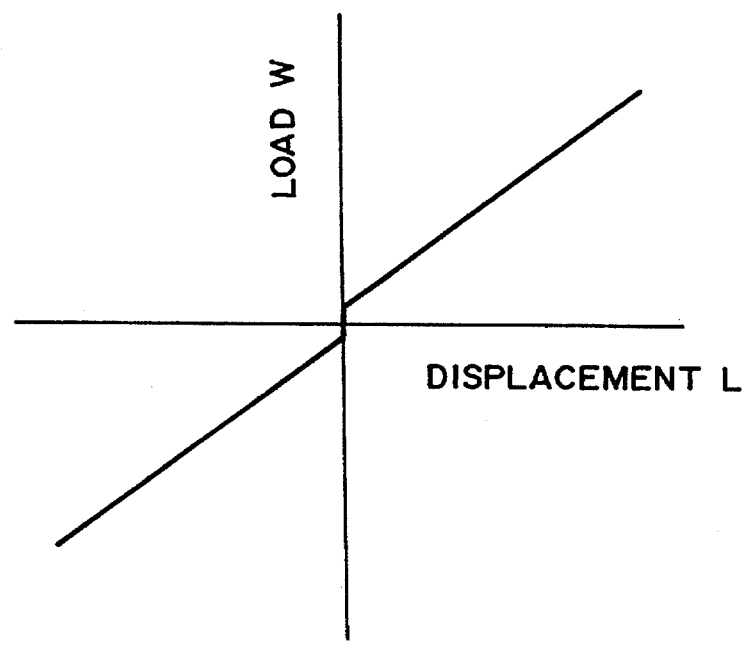
FIG. 3 is a diagram showing the relationship between the displacement L of the rear wheel output shaft over the axial direction and the load W given to the centering spring.

In order to displace the aforesaid rear wheel output shaft 11 in the axial direction for a desired amount for the provisions of a desired steering angle to the rear wheels 9 and 9, it is necessary to adjust the value E of the current given to the aforesaid motor 19 so that the output torque of the aforesaid electric motor 19 is matched with the load W of the centering spring 25 indicated on the axis of ordinate in the aforesaid FIG. 3. Now that the value E of the current given to the d.c. electric motor 19 and the output torque of the electric motor 19 are in proportional relationship, the relationship between the current value E of the electric motor and the displacement amount L of the aforesaid rear wheel output shaft 11 becomes as shown in FIG. 4 when steering angles are given to the rear wheels 9 and 9 in accordance with the energizing of the electric motor 19.

Figure 4:
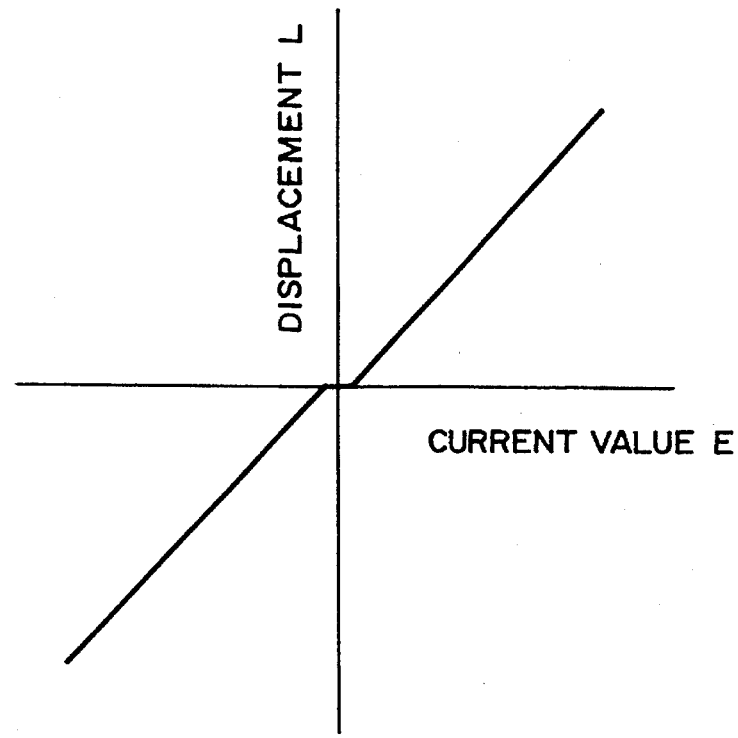
FIG. 4 is a diagram showing the relationship between the displacement L of the rear wheel output shaft over the axial direction and the current value E flowing in the electric motor.

In the arithmetic processing unit of the aforesaid controller 24, there is incorporated a function capable of adjusting the energizing amount for the electric motor 19 on the basis of the relationship represented in the aforesaid FIG. 4. Then, on the basis of the signals being transmitted from the aforesaid front wheel steering angle sensors 8 and 8 and vehicle speed sensor 23, a desired current is given to the aforesaid electric motor 19 in accordance with the relationship represented in FIG. 4 when it is determined that a steering angle should be given to the aforesaid rear wheels 9 and 9 to displace the aforesaid rear wheel output shaft 11 only by the desired amount.

The operation of a four-wheel steering apparatus according to the present invention such as structured above will be described next.

At first, if it is determined that there is a need of giving a desired steering angle to the rear wheels 9 and 9, the aforesaid controller 24 determines on the basis of the signals from the front wheel steering angle sensors 8 and 8 and vehicle speed sensor 23 and, further on the basis of the signals, if required, from a lateral acceleration sensor or yaw rate sensor (not shown), the size of the steering angle to be given to the rear wheels 9 and 9 on the basis of the signals from the aforesaid front wheel steering angle sensors 8 and 8 and vehicle speed sensor 23 as well as the displacement amount L of the rear wheel output shaft 11 which is required to obtain the aforesaid steering angle.

Then, based on the displacement amount L thus obtained, a desired amount of the current value E is given to the aforesaid electric motor 19 in accordance with the relationship shown in the aforesaid FIG. 4 to give the desired steering angle to each of the rear wheels 9 and 9.

The displacement amount L given to the rear wheel output shaft 11 on the basis of the energizing of the electric motor 19 is detected by the displacement sensor 22 mounted on the end portion of the transmission shaft 16, and is inputted into the aforesaid controller 24. However, in the case of the four-wheel steering apparatus of the present invention, the signal from the aforesaid displacement sensor 22 is only used for the so-called fail-safe in determining whether or not the displacement amount L of the rear wheel output shaft 11 has been provided as desired.

In other words, the controller 24 performs the open loop control which is not related to the signals from the displacement sensor 22 to displace the rear wheel output shaft 11 and does not perform any closed loop control utilizing the signals from the displacement sensor 22. Therefore, if the reliability of the combined devices is sufficiently high, the aforesaid displacement sensor 22 can be omitted.

Here, in the embodiment shown in FIG. 1 and FIG. 2, the provision of the steering angles to the rear wheels 9 and 9 on the basis of the energizing of the electric motor 19 as set forth above is executed only when the vehicle is driven at comparatively low speeds (for example, 40 km/h or less) in consideration of safety in a case where the system should be troubled. Then, in the embodiment shown in FIG. 1 and FIG. 2, if the vehicle is driven at speeds exceeding the aforesaid predetermined speed (40 km/h), the controller 24 does not perform any longer the control of the steering angles given to the rear wheels 9 and 9 irrespective of the signals from the front wheel steering sensors 8 and 8 and vehicle speed sensor 23. In other words, when a vehicle is driven at speeds exceeding a predetermined speeds, the controller will never cause the electric motor 19 to be energized. However, the output shaft 20 of the electric motor 19 is not locked even when the electric motor is not energized, and the shaft is freely rotatable by an external force.

Then, in the embodiment shown in FIG. 1 and FIG. 2, if a lane change is performed in a case where the vehicle is being driven at speeds exceeding a predetermined speed as described above, the steering angles are given to the rear wheels 9 and 9 by centrifugal forces at the same phase as those having given to the front wheels 6 and 6 so as to maintain the stability of the vehicle in changing the driving lanes.

For example, if, on the basis of operating the steering wheel 1, the front wheels 6 and 6 are displaced in the direction indicated by arrows α in FIG. 1, the rear wheels 9 and 9 are swung to the right in FIG. 1 by the centrifugal force generated accompanying the lane changes performed by the vehicle, and the force F, which is exerted in the lateral direction as indicated by arrow β, is added to each of the rear wheels 9 and 9 due to the friction between each of the rear wheels 9 and 9 and the ground.

This force F is given to the contacting area between the rear wheels 9 and 9 and the ground, that is, the perpendicular area including the points of application force 12 and 12 of each of the rear wheels 9 and 9. Meanwhile, since the steering centers 14 and 14 on each of the rear wheels 9 and 9 are positioned backwards in the traveling direction of the vehicle from the aforesaid points of application force 12 and 12 by a distance l, each of the rear wheels 9 and 9 are steered in the direction indicated by arrow γ in FIG. 1 by a moment F∩l.

Thus, as each of the rear wheels 9 and 9 is being steered in the direction indicated by arrow γ, the rear wheel output shaft 11 is displaced in the axial direction to compress the centering spring 25. Accordingly, the steering angle given to each of the rear wheels 9 and 9 is maintained in a state where the force given to the axial direction of the rear wheel output shaft 11 on the basis of the lateral force F and the compression of the aforesaid centering spring 25 are balanced.

Because of this, when the vehicle speed exceeds a predetermined speed, the steering angles given to the rear wheels 9 and 9 are always in the same phase as the front wheels 6 and 6. Also, in this case, the size of the steering angles given to the rear wheels 9 and 9 is determined by the strength of the lateral force F added to the rear wheels 9 and 9 resulting from the centrifugal force generated accompanying the changes in the driving lane by the vehicle, and there is no direct relationship (though greatly related indirectly) to the vehicle speeds or the size of the steering angles given to the front wheels 6 and 6.

Hence, the provision of the steering angles to the rear wheels 9 and 9 by the electric motor 19 is not conducted at all when the vehicle is driven at high speeds, but the steering angles are given to the rear wheels 9 and 9 only by physical forces. As a result, it is possible to make the structure of the four-wheel steering apparatus simpler as well as to make it with extremely high reliability.

Here, in the embodiment shown in FIG. 1 and FIG. 2, the speed reducing mechanism provided between the electric motor 19 and the rear wheel output shaft 11 comprises the worm 21 and worm wheel 18 so that the reverse efficiency is restrained to be low. Consequently, when the steering angles are given to the rear wheels 9 and 9 by the electric motor 19 in driving at low to medium speeds and such condition is kept, any great load to the aforesaid electric motor 19 is not caused to remain because of the working resiliency of the aforesaid centering spring 25.

Because the four-wheel steering apparatus of the present invention is structured to operate as set forth above, there is no need for providing any complicated circuitry and/or hydraulic or pneumatic pipings, making it possible to provide the four-wheel steering apparatus at comparatively low cost.

In order to improve the driving stability of a vehicle when it travels at high speeds, it is necessary to perform a fine steering angle control with respect to the rear wheels 9 and 9 on the basis of the signals from the aforesaid yaw rate sensor or the like. In this case, the steering angle given to each of the rear wheels 9 and 9 is small. Accordingly, the displacement amount given to the rear wheel output shaft 11, which is given accompanying the provision of the steering angle, is also small. Hence, the compression value of the centering spring 25 is small, too.

On the other hand, in the aforesaid embodiment, the spring characteristic of the aforesaid centering spring is linear (displacement amount and resiliency change linearly) and the resiliency variation of the aforesaid centering spring 25 is also small when the steering angles are given to the rear wheels 9 and 9. As a result, it becomes difficult to adjust the steering angles given to the rear wheels 9 and 9 finely by the so-called open loop control whereby only the value E of the current given to the aforesaid electric motor 19 is controlled.

By defining the spring constant of the aforesaid centering spring 25 to be larger so as to make the resiliency variation of the centering spring 25 greater with respect to the displacement amount of the aforesaid rear wheel output shaft 11, it becomes possible to adjust the steering angles given to each of the rear wheels 9 and 9 finely. However, it becomes necessary to exert a greater force when large steering angles should be given to each of the rear wheels 9 and 9. Consequently, not only the aforesaid electric motor 19 would need to be replaced with a larger one, but also the current value E required to give a large steering angles to the rear wheels 9 and 9 would become unnecessarily great, undesirably causing more load on the battery. An embodiment set forth below is designed to solve this problem.

Figure 5:
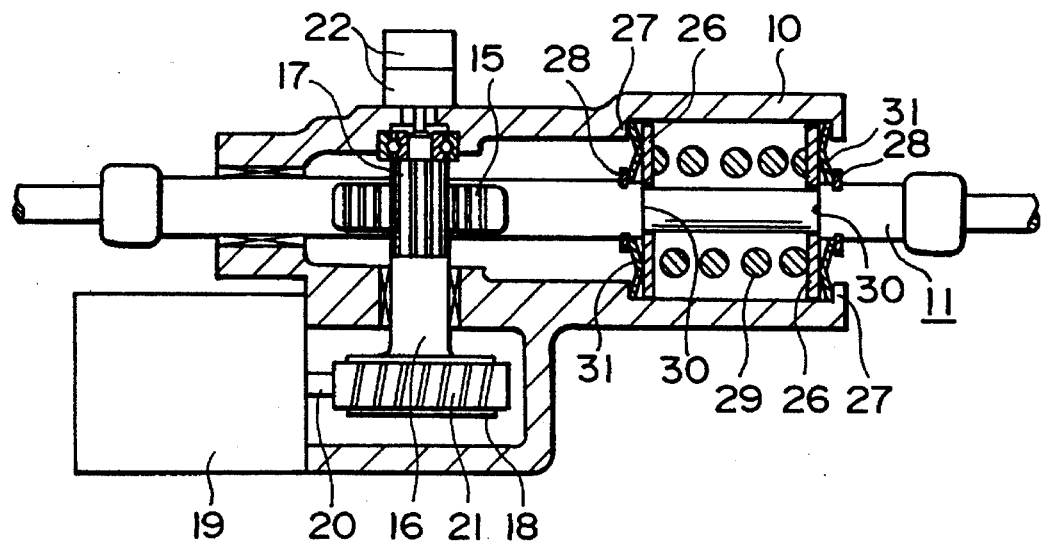
FIG. 5 is a cross-sectional plan view corresponding to the A section of FIG. 1, which illustrates another embodiment of an electric four-wheel steering apparatus according to the present invention.
Figure 6:
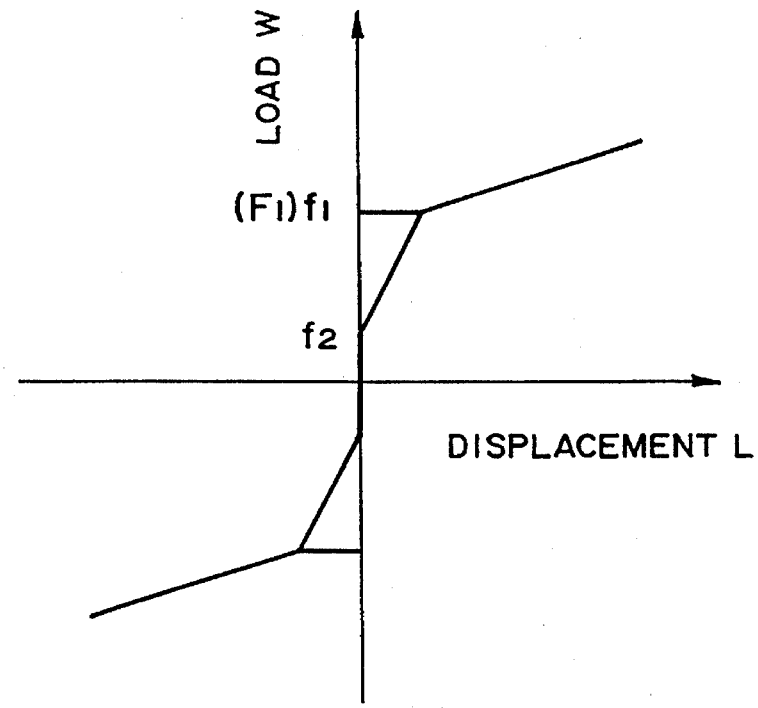
FIG. 6 is a diagram showing the relationship between the displacement L of the rear wheel output shaft over the axial direction and the load W corresponding to the compression value of the centering spring.

FIG. 5 and FIG. 6 illustrate another embodiment of an electric four-wheel steering apparatus according to the present invention. The rear wheel output shaft 11, which gives the steering angles to the rear wheels 9 and 9 (FIG. 1) by displacing it in the axial directions, is supported with a slight freedom of displacement in the axial direction (the left and right directions in FIG. 5) as well as resiliency with respect to the housing 10 supported on the floor face or the like of the vehicle. On the intermediate portion of the aforesaid rear wheel output shaft 11, a pair of washer plates 26 and 26 are attached to the rear wheel output shaft 11 at intervals, being fitted thereto with a freedom of displacement in the axial direction of the rear wheel output shaft 11. A first centering spring 29, having a resiliency just enough to cause the aforesaid rear wheel output shaft 11 to be also returned to the neutral position in a case of the aforesaid electric motor 19 being in trouble, is provided between the inner faces of the both washer plates 26 and 26.

The inner circumferences of the aforesaid pair of washer plates 26 and 26 face respectively the staged portions 30 and 30 (but stop springs or the like can be used instead) provided on the outer circumference of the intermediate portion of the aforesaid rear wheel output shaft 11 so that while the distance of both washer plates 26 and 26 can be reduced, it cannot be expanded over a certain extent. Then, the space between the aforesaid staged portions 30 and 30 is defined so that the aforesaid first centering spring 29 is caused to remain in a state where a certain value of preliminary pressure $f_1$ is given as it is even when the distance between both washer plates 26 and 26 is maximized as shown in FIG. 6.

Also, on the inner periphery of the aforesaid housing 10, a pair of staged portions 27 and 27 are formed at intervals with each other, and a pair of stop rings 28 and 28 are fixedly provided at portions sandwiching the aforesaid pair of washer plates 26 and 26 on the outer periphery of the intermediate portion of the aforesaid rear wheel output shaft 11. Then, the second centering springs 31 and 31 which are disc springs respectively are sandwiched between both stop rings 28 and 28 and staged portions 27 and 27, and the aforesaid pair of washer plates 26 and 26.

The spring constant of these centering springs 31 and 31 is made greater than that of the first centering spring 29. However, the preliminary pressure $f_1$ given by sandwiching the aforesaid first centering spring 29 with the aforesaid pair of washer plates 26 and 26 should be substantially equal to the resiliency $F_1$ ($f_1 \approx F_1$) occurring to each of the second centering springs 31 and 31 when the second centering springs 31 and 31 are compressed to the maximum. Also, to each of the second centering springs 31 and 31, a certain preliminary pressure $f_2$ (which is smaller than the preliminary pressure $f_1$ given to the first centering spring 29, ($<f_1$) is exerted between the aforesaid pair of washer plates 26 and 26 and staged portions 27 and 27, and stop rings 28 and 28.

As a result of the structure described above, absent an external force generated by the aforesaid electric motor 19 having been energized, the aforesaid rear wheel output shaft 11 is caused to be returned to the neutral position by the resiliency of the aforesaid first and second centering springs 29 and 31 arranged in series with each other. Both centering springs 29 and 31 are provided with the preliminary pressures to compress the aforesaid pair of stop rings 28 and 28 with certain forces even when the aforesaid rear wheel output shaft 11 is at the neutral position (displacement 0) as shown in FIG. 5. As a result, the aforesaid rear wheel output shaft 11 is held at the neutral position securely and the aforesaid rear wheels 9 and 9 do not fluctuate.

When the electric motor 19 is energized and the rear wheel output shaft 11 is displaced in the axial direction to give a steering angle to the rear wheels, either one of the second centering spring 31 is compressed at first for the beginning. In other words, when the steering angle given to the rear wheels is small, the first centering spring 29 to which a comparatively great preliminary pressure $f_1$ is given is not compressed, and only either one of the aforesaid second centering springs 31 is compressed. The spring constant of these second centering springs 31 is large. Accordingly, the resiliency thereof can be varied greatly even by fine changes in the given steering angles. Therefore, it is easy to make a fine adjustment of steering angles given to the aforesaid rear wheels.

Also, if a steering angle given to the rear wheels is large so that the displacement amount of the aforesaid rear wheel output shaft 11 becomes large, either one of the aforesaid second centering springs 31 is completely compressed although it is not necessary to be compressed completely). Then, when the aforesaid rear wheel output shaft 11 is displaced further than that, the first centering spring 29 begins to be compressed. As described earlier, the spring constant of the first centering spring 29 is small. Therefore, even when the steering angle is changed greatly, the resiliency given to the rear wheel output shaft 11 by the aforesaid first and second centering springs 29 and 31 does not become too great. Accordingly, the force required to cause the aforesaid rear wheel output shaft 11 to be displaced in the axial direction does not become unnecessarily great.

The electric four-wheel steering apparatus of the present invention is structured and operated as described above and there are no need of providing any complicated circuitry and/or hydraulic or pneumatic pipings, thus making it possible to perform fine adjustment of the steering angles given to the rear wheels at comparatively low costs without increasing the consumption of electric power unnecessarily.

In order to perform an appropriate provision of steering angles to the rear wheels 9 and 9 by the so-called open control in which only the current value E given to the electric motor 19 is controlled in a four-wheel steering apparatus as described earlier, it is necessary to make the value of the resiliency of the aforesaid centering spring 25 (or 29) always constant. However, the aforesaid centering spring 25 is degraded as the time elapses, though extremely gradually. Therefore, it is not avoidable that the resiliency of the centering spring 25 is gradually reduced.

Figure 7:
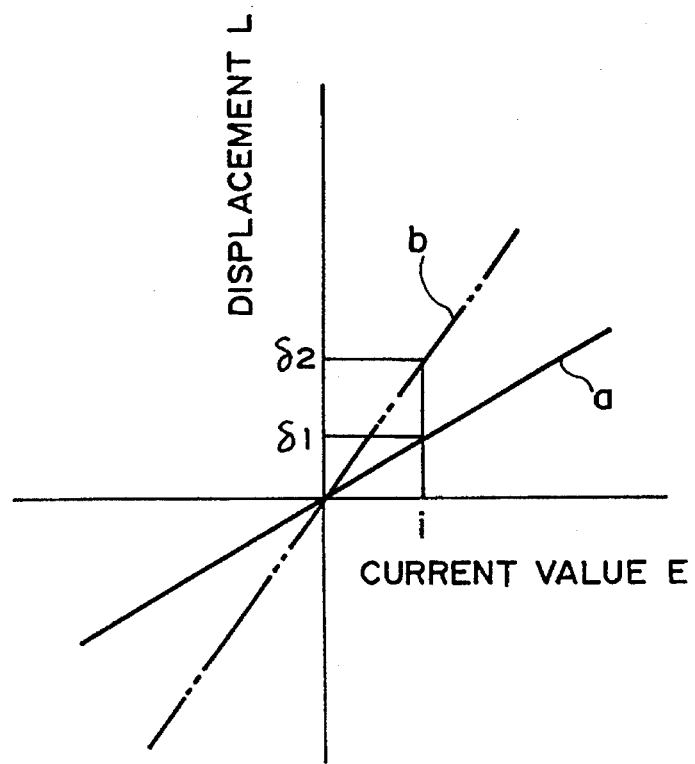
FIG. 7 is a diagram showing the state that the displacement of the rear wheel output shaft is deviated due to the deterioration of the centering spring by passage of the time.

As a result of such a reduction of the resiliency of the centering spring 25, the displacement amount of the aforesaid rear wheel output shaft 11 becomes larger even when the same current i is given to the aforesaid electric motor 19, thus the steering angle given to the rear wheels 9 and 9 becoming larger. In other words, the relationship between the aforesaid current value E and displacement amount L at the initiation is assumed to be in a state indicated by solid line a in FIG. 7 (for example, at E=i, L=$\delta_1$), but as a result of the reduction of the resiliency of the aforesaid centering spring 25, the relationship between the current E and displacement L is changed as indicated by chain line b in FIG. 7 (for example, at E=i, L=$\delta_2$).

Consequently, even if a target steering angle can be given to the rear wheels 9 and 9 by controlling only the aforesaid current value E at the initiation, the actual steering angle given to the rear wheels 9 and 9 will become larger than the target value as the gradual degradation of the centering spring 25 as the time passes.

Figure 8:
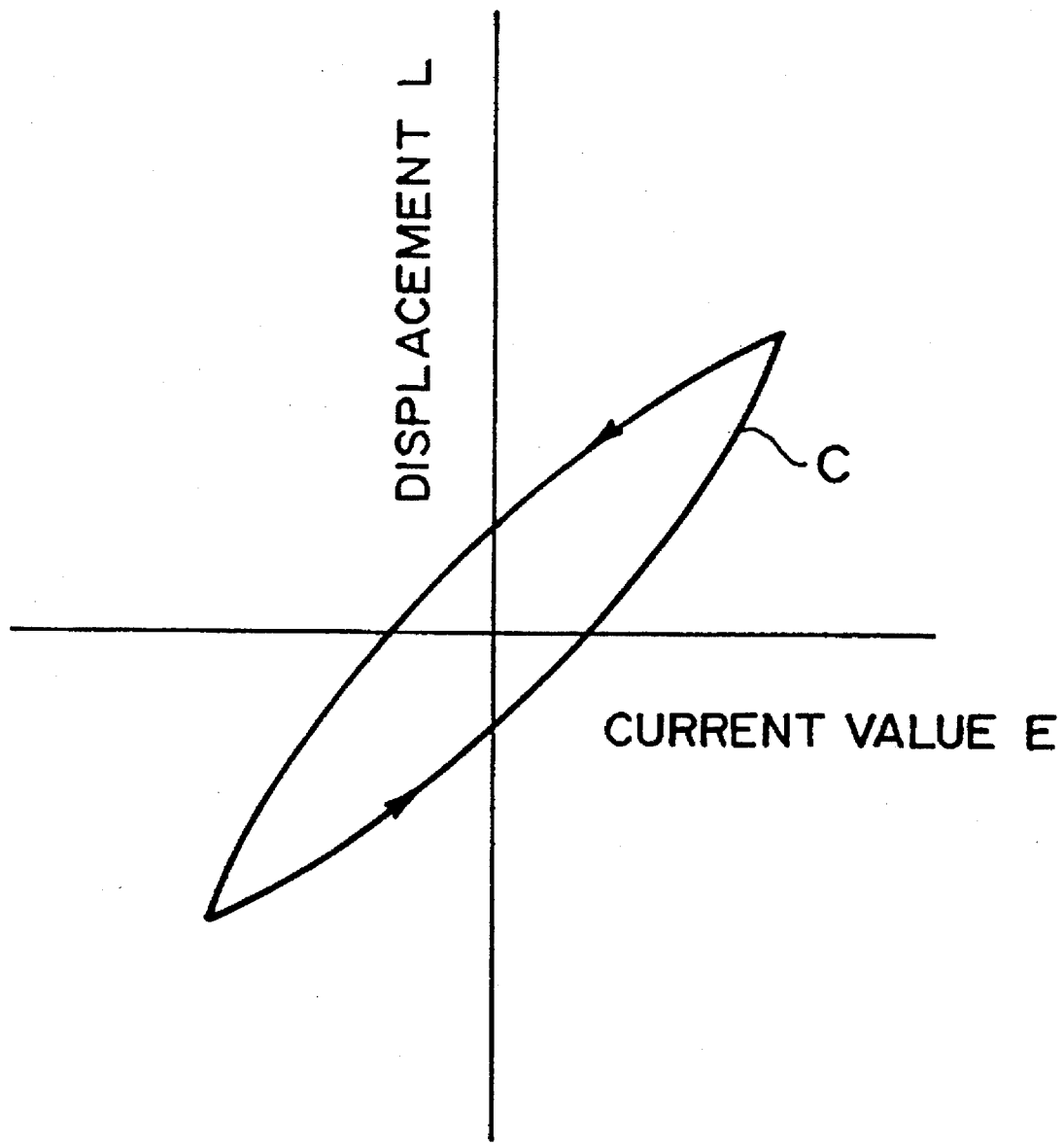
FIG. 8 is a diagram showing the state that the displacement of the rear wheel output shaft is deviated due to the hysteresis of the centering spring.

Also, in the centering spring, there exists hysteresis inevitably. When the aforesaid rear wheel output shaft 11 is traveled in both ways in the width direction of the vehicle against the resiliency of the centering spring which is set in accordance with FIG. 5 and FIG. 6 while the amount and direction of the current E being given to the aforesaid motor 19 are being changed, the relationship between the aforesaid current value E and the displacement amount L of the aforesaid rear wheel output shaft 11 represents the so-called hysteresis loop as indicated by curve c in FIG. 8.

As a result, even when the same amount of current i is given to the aforesaid electric motor 19, a difference results in the displacement amount L of the aforesaid rear wheel output shaft 11 whether the aforesaid centering spring is being compressed or this centering spring is being extended. Hence, the steering angle given to the rear wheels 9 and 9 cannot be matched to the target value after all. Therefore, considering this, a program may be provided in the aforesaid controller 24 to deal with the aforesaid hysteresis loop in advance, but as the shape of the hysteresis itself changes by the resiliency variation of the aforesaid centering spring or the improved conformability of sliding parts, the steering angle given to the rear wheels 9 and 9 still becomes unable to match the target value. An embodiment set forth below is intended to solve this problem.

An electric four-wheel steering apparatus according to the present invention is provided with front wheel steering sensors 8 and 8 for detecting the steering angles given to the front wheels 6 and 6 as shown in FIG. 1 and 2, a vehicle speed sensor 23 for detecting the vehicle speed, a rear wheel output shaft 11 for giving steering angles to the rear wheels by displacing it in the axial direction, a centering spring 25 having resiliency in the direction that this rear wheel output shaft 11 is returned to the neutral position, an electric motor 19 for causing the aforesaid rear wheel output shaft 11 to be displaced in the axial direction against the resiliency of this centering spring 25, and a controller 24 for controlling the energizing of the aforesaid electric motor 19 on the basis of signals from the aforesaid front wheel steering angle sensors 8 and 8 and vehicle speed sensor 23.

Then, this controller 24 calculates the target amount of a steering angle to be given to the rear wheels 9 and 9 on the basis of the signals from the aforesaid front wheel steering sensors 8 and 8 and vehicle speed sensor 23 and controls the aforesaid rear wheel output shaft 11 by the open loop control so that it can be displaced by a desired amount in order to give the steering angle which matches the target amount to the aforesaid rear wheels 9 and 9 by adjusting the output torque of the aforesaid electric motor 19 by adjusting the current i to be given to this electric motor 19, for example.

Further, in the electric four-wheel steering apparatus of the present invention, a displacement sensor (for example, the sensor 22 in FIG. 1) for detecting the displacement amount of the aforesaid rear wheel output shaft 11 is provided and at the same time, the output from this displacement sensor 22 is inputted into the aforesaid controller 24. Then, this controller 24 is provided with a function whereby to compare the output from the displacement sensor 22 and the aforesaid target amount and if there is a difference between these output and target amount, then the required correction value in the direction (positive or negative) to offset such a difference is added with respect to the output torque of this electric motor 19 by decreasing or increasing the current i to be given to the aforesaid electric motor 19.

In a case of an electric four-wheel steering apparatus according to the present invention such as structured above, even when the resiliency of the centering spring 25 is lowered due to the degradation resulting from the elapse of time or the hysteresis loop is changed, the controller 24 obtains the difference with the target amount to add a correction value to the output torque of the electric motor 19, thus making it possible to give the steering angle, which is equal to the target amount, to the rear wheels 9 and 9 irrespective of the aforesaid degradation of the centering spring 25 due to the elapsed time or the changed hysteresis loop.

For example, if the resiliency of the centering spring 25 is lowered due to the degradation resulting from the elapse of time, the displacement amount L of the rear wheel output shaft 11 becomes larger even when the same current i as at the initiation is given to the electric motor 19. As a result the steering angle given to the rear wheels 9 and 9 is caused to be larger than the target amount. Here, the aforesaid controller 24 performs a correction to make the current i given to the electric motor 19 smaller on the basis of the signals from the aforesaid displacement sensor 22.

Consequently, the corrected current value i is given to the aforesaid electric motor 19 to perform the provision of the steering angle matching the target amount to the rear wheels 9 and 9. A correction such as this is made each time a steering angle is given to the rear wheels 9 and 9. In practice, therefore, there occurs almost no difference which creates any problem in actual use between the steering angle given to the rear wheels 9 and 9 and the target amount.

Also, in a case where the displacement amount L of the aforesaid rear wheel output shaft 11 is deviated from the amount corresponding to the target amount of the rear wheel steering angle because of the changed hysteresis loop of the aforesaid centering spring 25, the value i of the current to be given to the aforesaid electric motor 19 is corrected so that the provision of the steering angle matching the target amount to the rear wheels 9 and 9 is performed.

Because the four-wheel steering apparatus of the present invention is structured to operate as set forth above, there is no need for providing any complicated circuitry and/or hydraulic or pneumatic pipings, making it possible to provide the four-wheel steering apparatus which is comparatively inexpensive, yet capable of performing the provision of the steering angle as a target amount to the rear wheels.

Figure 11:
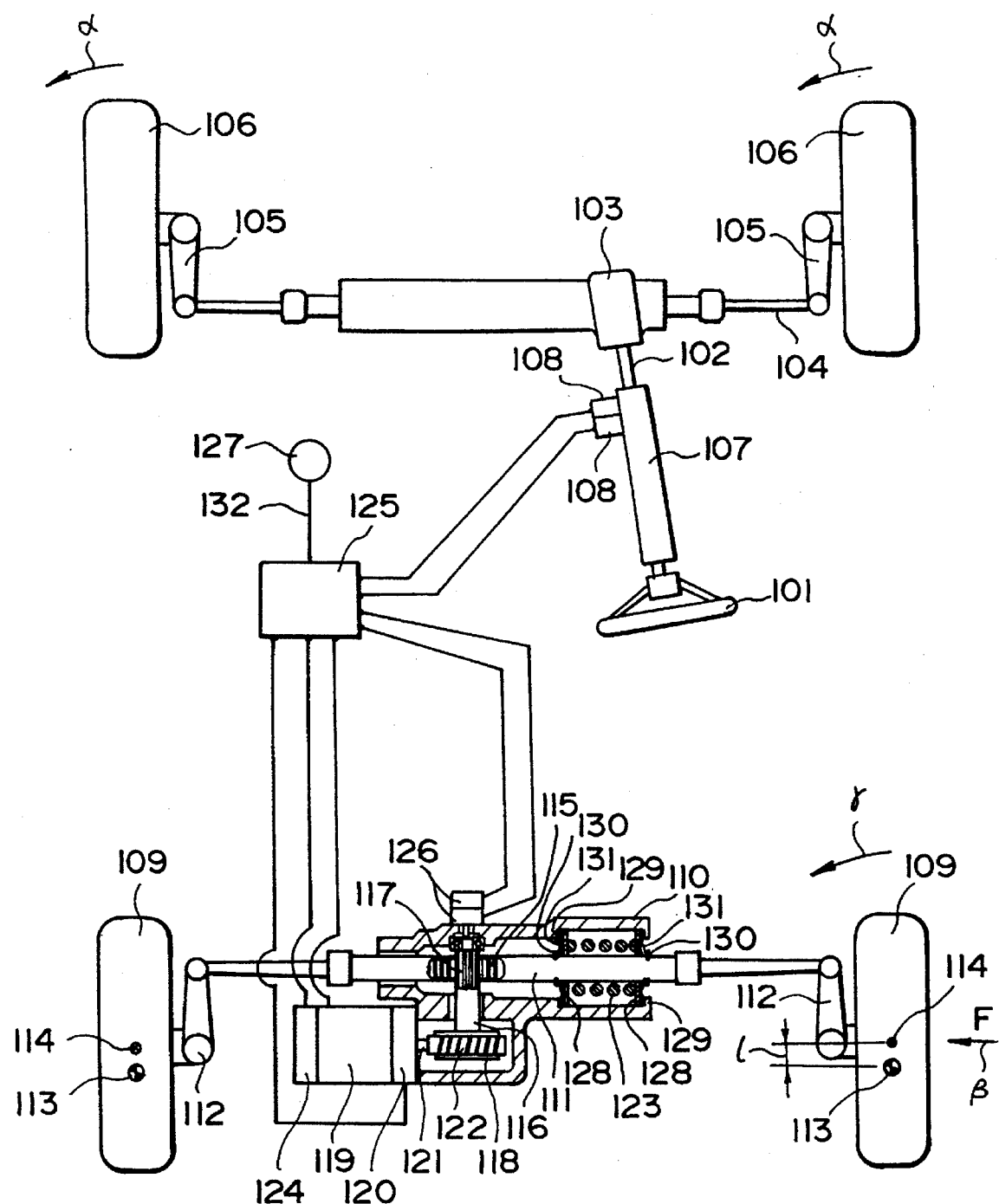
FIG. 11 is a horizontal cross-sectional plan view partially illustrating another embodiment of an electric four-wheel steering apparatus according to the present invention.

FIG. 11 illustrates another embodiment of the electric four-wheel steering apparatus according to the present invention. This electric four-wheel steering apparatus operates to provide the steering angles to the rear wheels by an electric motor only when the driving speed of the vehicle is comparatively low, and when the driving lanes are changed at a high speed driving, the steering angles are given to the rear wheels on the basis of the centrifugal forces; the provision of the steering angles to the rear wheels is performed by the so-called compliance steering mechanism thereon.

In this electric four-wheel steering apparatus, the operation of a steering wheel 101 provided with facing to the driver's seat is transmitted to the steering gear 103 through the steering shaft 102 to displace the front wheel output shaft 104 in the axial direction (the left and right directions in FIG. 11), and a desired steering angle is given to the front wheels 106 and 106 through a pair of left and right knuckle arms 105 and 105 coupled to the both ends of the aforesaid front wheel output shaft 104 respectively.

On the steering column 107 through which the aforesaid steering shaft 102 is penetrated, the steering angle sensors 108 and 108 are supported to freely detect the steering angles given to the front wheels 106 and 106 by the rotational angles of the steering shaft 102 detected by this steering angle sensors 108 and 108. In this respect, the reason why two steering angle sensors 108 and 108 are provided is that even if one of the steering angle sensors 108 fails, a desired control should be executed by the other sensor thereby implementing the required fail-safe.

Also, on the rear floor surface, a housing 110 is supported to accommodate the mechanism to give steering angles to the rear wheels 109 and 109 in such a manner that the housing cannot be displaced in the width direction of the vehicle (in the left and right directions in FIG. 11). Then, through the inside of this housing 110 the rear wheel output shaft 111 is provided in the left and right directions (the width direction of the vehicle). This rear wheel output shaft 111 provides steering angles for the rear wheels 109 and 109 by being displaced in the axial direction (the left and right directions in FIG. 11), and each of the rear wheels 109 and 109 and the left and right side ends of the rear wheel output shaft 111 is coupled respectively by the knuckle arms 112 and 112.

Then, as the aforesaid rear wheel output shaft 111 is displaced in the axial direction, each of the rear wheels 109 and 109 is rocked with the steering centers 113 and 113 as their respective centers, so that a steering angle corresponding to the displacement amount of the aforesaid rear wheel output shaft 111 is given to each of the rear wheels 109 and 109. Also, the steering centers 113 and 113 of the rear wheels 109 and 109 are positioned backward (downward direction in FIG. 11) from the point of application forces applied 114 and 114 (the center of the contact face between the bottom of tire and the ground) by a distance l in the longitudianl direction (the upward direction in FIG. 11).

A rack 115 is fixed on the intermediate section of the aforesaid rear wheel shaft 111, which is located in the aforesaid housing 110. Also, a pinion gear 117 is fixed to the one end of the transmission shaft 116 (the upper end in FIG. 11) which is rotatively supported in the aforesaid housing 110 with a helically positional relationship to the aforesaid rear wheel output shaft 111, and this pinion gear 117 is arranged to engage with the aforesaid rack 115. Also, on the other end of the aforesaid transmission shaft 116 (the lower end in FIG. 11) a worm wheel 118 is fixed.

Also, in order to constitute an electric acutator, an electric motor 119 is fixed on the outer face of the aforesaid housing 110. A worm 122 is fixed to the output shaft 121 driven by the rotational shaft (not shown) of the electric motor 119 through an electromagnetic clutch 120, and by the engagement of this worm 122 with the aforesaid worm wheel 118, a speed reducing mechanism is constructed to displace the aforesaid rear wheel output shaft 111 in the axial direction by the rotation of the aforesaid output shaft 121.

This speed reducing mechanism should have the reversibility in the power transmission direction. Thus, by rotation of the aforesaid output shaft 121, this mechanism displaces the rear wheel output shaft 111 in the axial direction, and by displacement of the rear wheel output shaft 111 in the axial direction, the shaft 121 is caused to rotate. However, the reversibility factor of the aforesaid speed reducing mechanism is low so as not to allow the load given by the centering spring 123, which will be described later, to be exerted on the aforesaid motor when the steering angles are given to each of the aforesaid rear wheels 109 and 109. Also, to the electric motor 119, a rotational angle sensor 124 is additionally provided to freely detect the rotational amount of the electric motor 119, and this amount is inputted into the controller 125 which will subsequently be described.

At the one end of the aforesaid transmission shaft 116, two displacement sensors 126 and 126 are provided to freely detect the displacement amount of the aforesaid rear wheel output shaft 111 through the transmission shaft 116. The detection signals transmitted from these two displacement sensors 126 and 126 are inputted into the controller 125 to control the energizing of the aforesaid motor 119 together with the detection signals form the aforesaid front wheel steering angle sensors 108 and 108 and the detection signals from a vehicle velocity sensor 127 for detecting the vehicle speed. In this respect, the reason why two of the aforesaid displacement sensors 126 and 126 are provided is also to implement the fail-safe.

The controller 125 serves to connect the aforesaid electromagnetic clutch 120 only when the vehicle speed detected by the aforesaid vehicle speed sensor 127 is lower than a predetermined value (for example, 40 km/h), and to perform the provision of the steering angle to the rear wheels 109 and 109 by the aforesaid electric motor 119 on the basis of the signals form the aforesaid steering angle sensors 108 and 108 and vehicle speed sensor 127. At this juncture, the controller controls the energizing of the aforesaid electric motor 119 on the basis of the signals form the rotational angle sensor 124. Also, the displacement sensors 126 and 126 mounted at the one end of the transmission shaft 116 detect the steering angle actually given to the rear wheels 109 and 109 and input the detected value into the aforesaid controller 125.

Also, the aforesaid rear wheel output shaft 111 is resiliently supported with a slight freedom of displacement in the axial direction with respect to the housing 110 fixed on the vehicle body. More particularly a pair of washer plates 128 and 128 are fitted from the outside apart from each other on the intermediate section of the aforesaid rear wheel output shaft 111 and supported to be displaceable in the axial direction of the rear wheel output shaft 111. There is provided in the space between the inner faces of the washer plates 128 and 128, the centering spring 123 having a resiliency just enough to enable the aforesaid rear wheel shaft 111 to be returned to the neutral position even when the aforesaid electric motor 119 is in trouble.

Also, in the inner periphery of the aforesaid housing 110, a pair of staged portions 129 and 129 are formed at intervals with each other, and the outer circumferential portions of the outer peripheries of the aforesaid pair of washer plates 128 and 128 are arranged to face the staged portions 129 and 129 respectively. Also, at the positions sandwiching the aforesaid pair of washer plates 128 and 128 on the outer perphery of the intermediate section of the aforesaid rear wheel output shaft 111, a pair of stop rings 130 and 130 are fixedly mounted to restrain the shifting of each of the washer plates 128 and 128 with respect to the rear wheel output shaft 111. Further, between the external faces of the aforesaid pair of washer plates 128 and 128, staged portions 129 and 129, and stop rings 130 and 130, disc springs 131 and 131 are provided.

The resiliency required to flatten the disc springs 131 and 131 completely is smaller than the resiliency when the aforesaid centering spring 123 begins to compressed, and when the rear wheel output shaft 111 is displaced with respect to the housing 110, the disc springs 131 and 131 are first displaced (flattened) as represented by a straight line a in FIG. 12. Then, the arrangement is made so that subsequent to either one of the disc springs 131 (on the leading end side of the displacement direction) having been completely flattened, the aforesaid centering spring 123 begins to be compressed between the pair of the washer plates 128 and 128 as represented by a straight line b in FIG. 12. However, the spring load, when each of the disc spring 131 and 131 is completely compressed, is slightly larger than the estimated maximum lateral load $F_{MAX}$ exerted on the rear wheel output shaft 111 on the basis of centrifugal forces generated in the expected driving conditions.

In the aforesaid electric four-wheel steering apparatus structured as above, when the vehicle travels at a speed lower than a predetermined speed (for example, 40 km/h), the controller 125 controls the energizing of the electric motor 119 on the basis of the signals from the front wheel steering angle sensors 108 and 108 and vehicle speed sensor 127 and provides the rear wheels 109 and 109 with desired steering angles as required. At this juncture, the electromagnetic clutch 120 is energized so that this electromagnetic clutch 120 remains in its connected condition.

In other words, when the vehicle travels at low to medium speeds, steering angles are given to the rear wheels 109 and 109 at the opposite phases of the steering angles provided for the front wheels 106 and 106 in order to improve the turning capability of the vehicle. However, the steering angles given to the rear wheels 109 and 109 are made smaller as the vehicle speeds become faster as represented by a solid line c in FIG. 13. In this case, the steering angles given to the rear wheels 109 and 109 are detected by the displacement sensors 126 and 126 mounted at the one end of the transmission shaft 116, and the detected values are inputted into the controller 125 to implement fail-safe.

In this respect, the steering angle ratio represented by the axis of ordinate in FIG. 13 is the ratio between a steering angle $\theta_R$ given to the rear wheels and a steering angle $\theta_F$ given to the front wheels ($\theta_R/\theta_F$), showing that the larger the absolute value is, the greater is the steering angle given to the rear wheels. Also, in the region above the axis of abscissa, the steering angles of the rear and front wheels are in the same phase, and in the region below, in the reverse phase.

On the other hand, when the vehicle travels at a speed exceeding a predetermined speed (40 km/h), the energizing of the aforesaid electromagnetic clutch 120 is suspended to disconnect the electromagnetic clutch 120. As a result, the controller 125 is not allowed to control the provision of steering angles to the rear wheels 109 and 109 any more irrespective of the signals from the steering angle sensors 108 and 108 and vehicle speed sensor 127. Also, the energizing of the electric motor 119 is suspended, if required.

Thus, if the vehicle changes lanes in traveling at a speed exceeding a predetermined speed, steering angles are given to the rear wheels 109 and 109 by centrifugal forces with the same phase of the front wheels 106 and 106, so that the stability of the vehicle can be maintained in changing the driving lanes.

For example, if the front wheels 106 and 106 are displaced by the operation of the steering wheel 101, in the direction indicated by arrow α in FIG. 11, the rear wheels 109 and 109 are swung to the right side in FIG. 11 by the centrifugal forces accompanying the changes in the vehicle's driving lanes, and the lateral force F is given to each of the rear wheels 109 and 109 as indicated by arrow β in FIG. 11 by the friction between the ground and each of the rear wheels 109 and 109. This force F is exerted on the contacting faces between the rear wheels 109 and 109 and the ground, i.e., the vertical plane including the point of application force for each of the rear wheels 109 and 109. Meanwhile, since the steering centers 113 and 113 of the rear wheels 109 and 109 are positioned backward from the aforesaid points of application force 114 and 114 in the traveling direction of the vehicle by a distance l, each of the rear wheels 109 and 109 is steered in the direction indicated by arrow γ in the FIG. 11 by a moment F•l.

Thus, following the steering of each of the rear wheels 109 and 109 in the direction indicated by arrow γ, the rear wheel output shaft 111 is displaced in the axial direction and one of the disc springs (on the left side in FIG. 11) 131 is compressed. Consequently, the steering angle given to each of the rear wheels 109 and 109 is held in a state that the force exerted in the axial direction of the rear wheel output shaft 111 on the basis of the aforesaid lateral force F and the force exerted on the rear wheel output shaft 111 on the basis of the compression of the aforesaid disc spring 131 are well balanced.

Hence, if the vehicle speed exceeds a predetermined value, the steering angles given to the rear wheels 109 and 109 are always in the same phase as those given to the front wheels 106 and 106 as represented by a dashed line d in FIG. 13. Also, in this case, the size of the steering angles given to the rear wheels 109 and 109 is defined only by the intensity of the lateral force F exerted on the rear wheels 109 and 109 by the centrifugal forces accompanying the changes in the vehicle's driving lanes, and is not directly related to the vehicle speed and the steering angles given to the front wheels 106 and 106 (although indirectly related thereto significantly).

Also, the allowable range of compression given to the disc springs 131 and 131 is limited. Accordingly, there is no possibility that any excessively large steering angle is given to the rear wheels 109 and 109. Thus, the provision of steering angles to the rear wheels 109 and 109 by the electric motor 119 is not performed at all when the vehicle travels at high speeds, but only by physical force is the provision of steering angles to the rear wheels 109 and 109 performed. The mechanism for deenergizing the electromagnetic clutch 120 and the electric motor 119 can be a simple one, and it is possible to obtain a sufficient reliability of such mechanism as well as to make the accompanying fail-safe mechanism added to this portion of such mechanism also simple and highly reliable.

Figure 9:
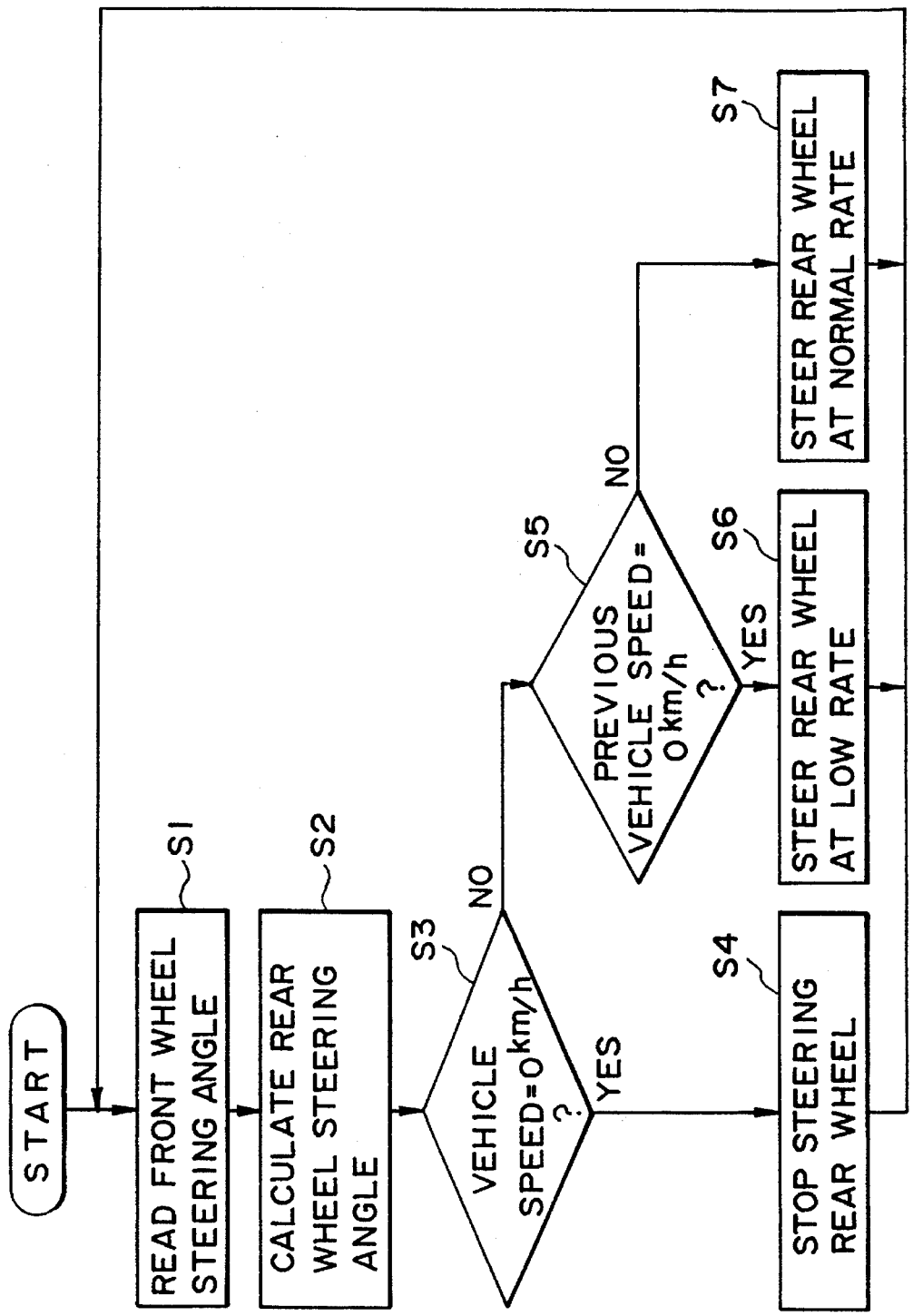
FIG. 9 is a flowchart showing an example of the operation of an electric four-wheel steering apparatus according to the present invention.
Figure 10:
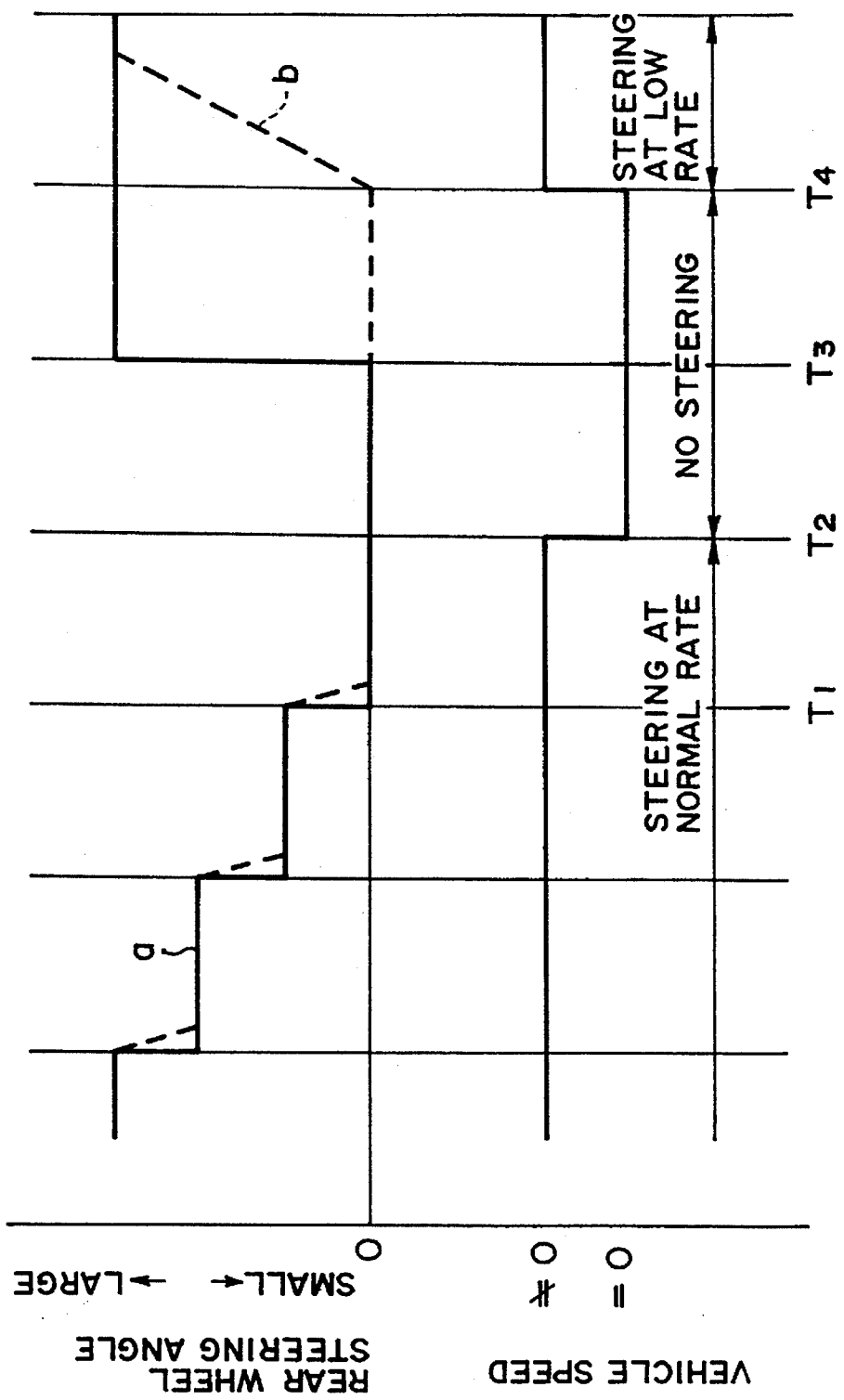
FIG. 10 is a time chart showing an example of the operation of an electric four-wheel steering apparatus according to the present invention.

FIG. 9 and FIG. 10 illustrate an example of a controlling conditions when the electric four-wheel apparatus of the present invention performs the provision of steering angles to the rear wheels. The electric four-wheel steering apparatus according to the present embodiment inputs the detected signals from the vehicle speed sensor 127 for detecting the driving speeds of the vehicle into the controller 125 through the conducting line 132 as shown in FIG. 11 as in the case of the aforesaid electric four-wheel steering apparatus.

Then, this controller 125 makes the judgments and instructions as shown in FIG. 9 in order to perform the provisions of steering angles to the rear wheels 109 and 109 (FIG. 11) as shown in FIG. 10, for example, in accordance with changes in the vehicle speed.

At first, in step S1, the detected signals transmitted from the front wheel steering sensors 108 and 108 (FIG. 11) are read into the controller 125. Then, in step S2, the steering angle to be given to the rear wheels 109 and 109 is calculated on the basis of the detected signals, and subsequently, in step S3, the signals from the vehicle speed sensor 127 are examined. If the vehicle speed is judged to be zero, the electrical actuator for the electric motor 119 (FIG. 11) and others are not energized. In other words, as represented in step S4, no steering angles are given to the rear wheels 109 and 109 as long as the vehicle speed is zero.

If the vehicle speed is not determined to be zero, whether or not the previous vehicle speed determined before a predetermined time (a second or a period less than that) is examined in step S5.

If the previous vehicle speed is found to be zero, it is interpreted that the vehicle's driving has just started and that no steering angle has been given to the rear wheels 109 and 109 just until now. If a large steering angle is assumed to have been given to the front wheels 106 and 106 in such a state, then the feel to the driver is unnatural when a steering angle is given to the rear wheels 109 and 109 abruptly in an amount corresponding to the steering angle given to the front wheels.

Therefore, in the electric four-wheel steering apparatus of the present invention, the provision of steering angles to the rear wheels 109 and 109 is performed gradually as in the step S6 if the previous vehicle speed is zero. Such a gradual provision of the steering angles to the rear wheels 109 and 109 is effected until when the controller 125 gives to the rear wheels 109 and 109 the steering angle which has been calculated in accordance with the front wheel steering angle in the step S2. As a result, the driver does not feel any unnaturalness immediately after the vehicle's driving has begun, and an appropriate provision of the steering angles to the rear wheels 109 and 109 can be performed.

If the previous vehicle speed is not found to be zero, it is interpreted that the vehicle has been traveling from the previous time. In such a state, the steering angles are given to the rear wheels 109 and 109 in amounts corresponding to those given to the front wheels as in the step S7. Then, as the provision of the steering angles to the rear wheels 109 and 109 is performed in synchronization with the operation of the steering wheel 101 (FIG. 11), no unnatural feeling will be given to the driver.

Thereafter, on the basis of the signals transmitted from the a pulse oscillator incorporated in the aforesaid controller 125, the aforesaid judgment is performed repeatedly at intervals of the aforesaid predetermined period.

In this respect, FIG. 10 shows a state where the provision of the steering angle to the rear wheels 109 and 109 is performed in such a manner that the steering angle given to the front wheels 106 and 106 is being made smaller to make the steering angle to the front wheels 106 and 106 zero at a time $T_1$ and then, subsequently, at a time $T_3$, the steering wheel 1 is at a time $T_2$, the vehicle is brought to a stop, and operated to perform the provision of a steering angle while the vehicle is at reset (the so-called stationary swing), subsequent to which, the vehicle is started at a time $T_4$.

In FIG. 10 solid line a indicates the steering angles to be given to the rear wheels 109 and 109 calculated in accordance with the front wheel steering angles in the aforesaid step 2, and broken line b indicates the steering angles actually given to the rear wheels 109 and 109 on the basis of signals from the controller 125, respectively.

In this respect, the electric four-wheel steering apparatus of the present invention is applicable to any types of structure if only the steering angles are given to the rear wheels on the basis of the energizing of an electric motor. In other words, an electric four-wheel steering apparatus to which the present invention is not necessarily of the type having the compliance steering mechanism incorporated.

The electric four-wheel steering apparatus of the present invention is structured and operated as described above. Therefore, even when the vehicle speed sensor is in trouble or the conductive wiring should be cut, it is possible to secure a highly sound safety by preventing the steering angles in the opposite direction to the front wheels from being given to the rear wheels.

Figure 14:
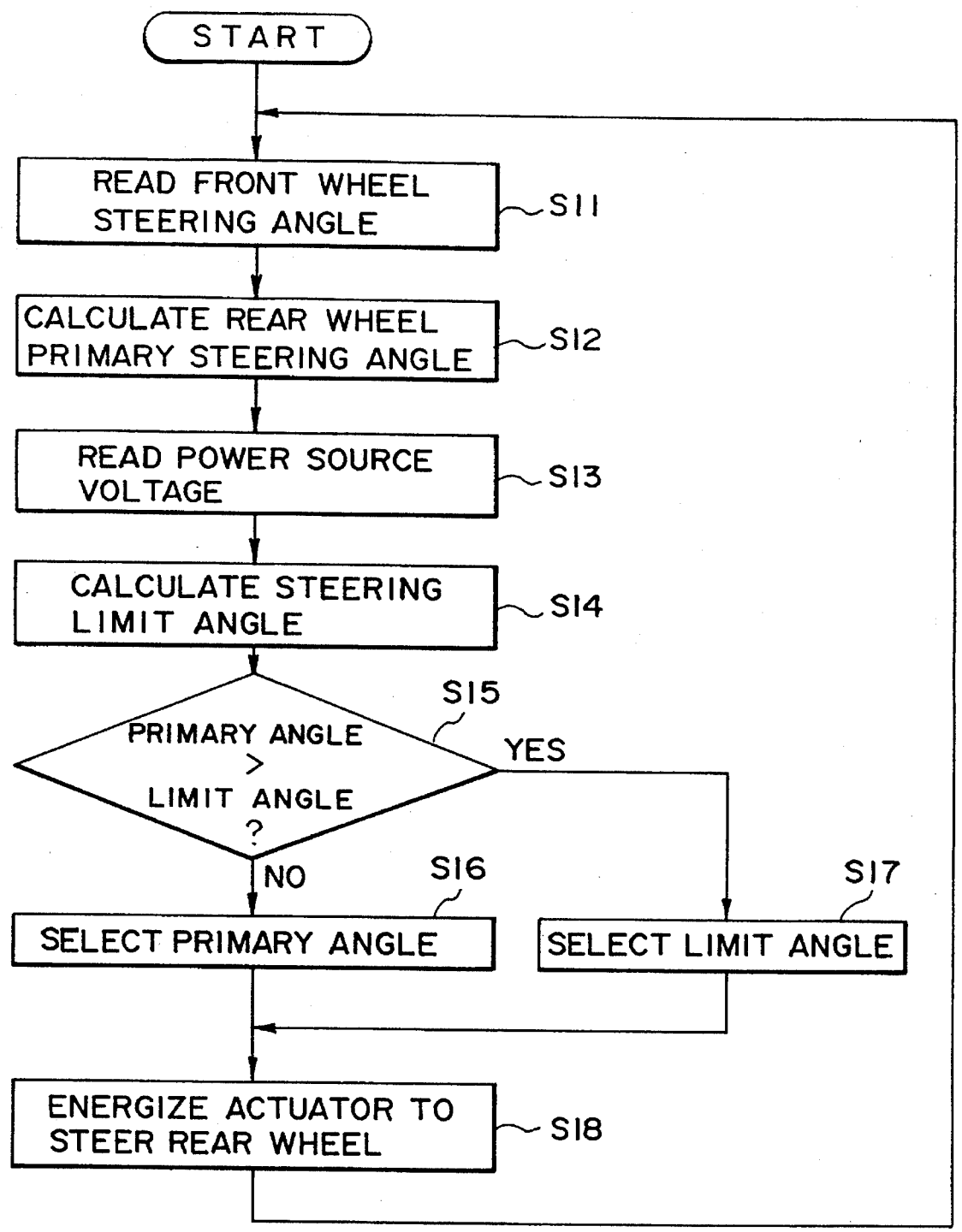
FIG. 14 is a flowchart showing another example of the operation of an electric four-wheel steering apparatus according to the present invention.

FIG. 14 shows another example of the controlling state where the electric four-wheel steering apparatus of the present invention performs the provision of steering angles to the rear wheels. The electric four-wheel steering apparatus of the present invention detects the voltage of a battery (not shown) by a source voltage detecting means such as a voltmeter (not shown, either) and inputs the detected signals from this source voltage detecting means into a controller 125 (FIG. 11).

Then, this controller 125 performs the provision of steering angles to the rear wheels 109 and 109 (FIG. 11) in accordance with changes in the vehicle speed by executing the judgments and instructions as shown in FIG. 14.

At first, in step S11, the signals being transmitted from the front wheel steering angle sensors 108 and 108 (FIG. 11) are read to the controller 125. Then in step S12, the steering angle (rear wheel primary steering angle) to be given to the rear wheels 109 and 109 is calculated if the battery is assumed to provide a sufficient voltage. Subsequently, in step S13, the detected signals from the source voltage detecting means are read and in step S14, the maximum value of a steering angle (steering angle limiting value) which can be given to the rear wheels is calculated. In other words, in this step S14, a load applicable to the battery is considered in accordance with the current voltage of the battery and the aforesaid steering angle limiting value is obtained. This steering angle limiting value is defined within the scope where the performance of the battery is not paralyzed even if this limiting steering value should be given to the rear wheels.

As set forth above, the rear wheel primary steering angle is calculated in step S12, and as the steering angle limiting value is obtained subsequently in step S14 (the order in which the rear wheel primary steering angle and steering angle limiting value may be reversed), the sizes of these rear wheel primary steering angle and steering angle limiting value are examined in step S15 and the smaller value is given to the rear wheels.

In other words, in a case where the steering angle limiting value is smaller than the rear wheel primary steering angle, the rear wheel primary steering angle is adopted as a steering angle to be given to the rear wheels as shown in step S16, and if the steering angle limiting value is smaller than the rear wheel primary steering angle, then the steering angle limiting value is adopted as a steering angle to be given to the rear wheels as shown in step S17.

Then, in step S18, the electric actuator is energized to provide the rear wheels with the rear wheel primary steering angle or the steering angle limiting value adopted in the aforesaid step S16 or S17.

Thereafter, the above-mentioned steps S11 through S18 are repeated for each predetermined time (a second or a short period less than a second) in accordance with the signals and others form the pulse oscillator incorporated in the aforesaid controller 125 as long as the vehicle is in traveling.

Figure 15:
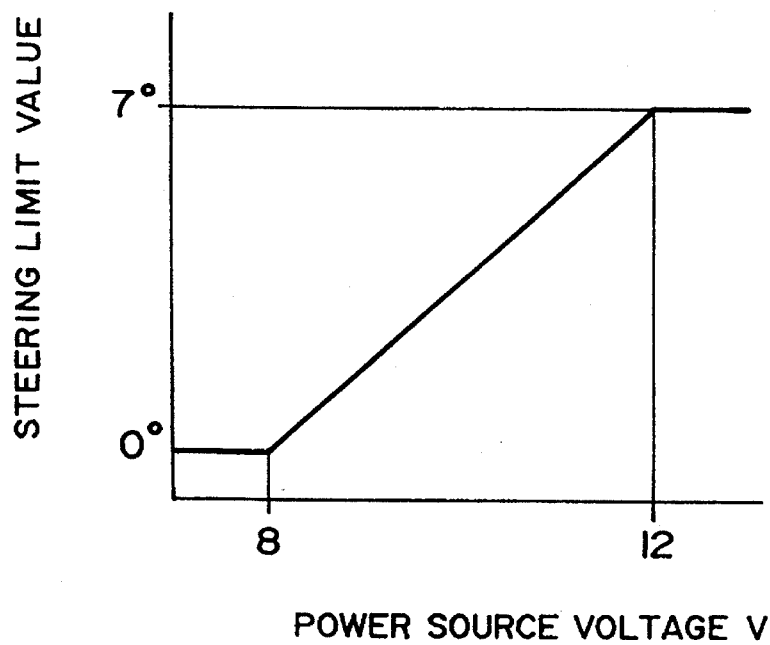
FIG. 15 is a diagram showing a first example of the relationship between the battery voltage and steering angle limiting value.
Figure 16:
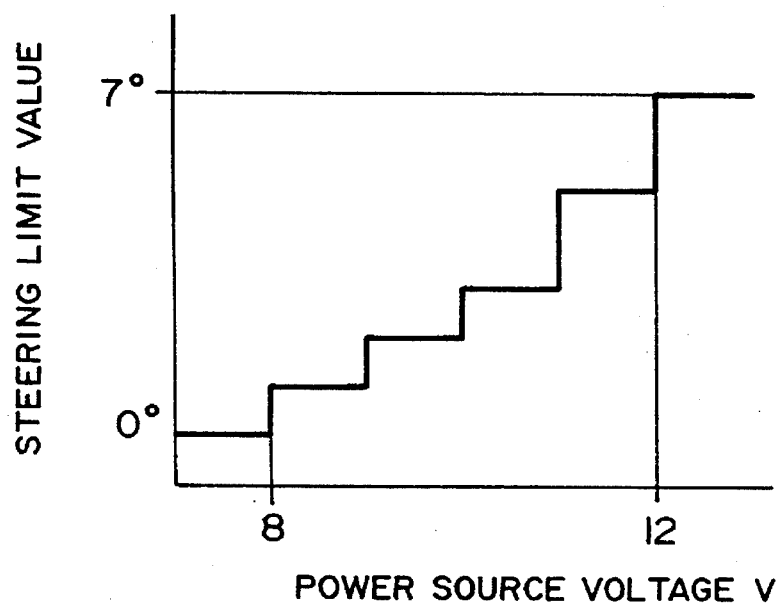
FIG. 16 is a diagram showing a second example of the relationship between the battery voltage and steering angle limiting value.

In this respect, FIG. 15 and FIG. 16 show the relationship between the battery voltage and the steering limiting value. In the aforesaid step S14, the aforesaid steering angle limiting value is obtained on the basis of the relationship such as shown in FIG. 15 and FIG. 16, and the value thus obtained is transferred to the aforesaid step S15. As shown in FIG. 15 and 16, if the voltage of the battery is 12 V, it is interpreted that there is no possibility that the function of the battery is paralyzed by energizing the electrical actuator, and the aforesaid steering angle limiting value is defined as a maximum steering value (7° in the case represented in FIG. 15 and FIG. 16) which can be given to the rear wheels. If the voltage of the battery is less than 8 V, then it is interpreted that the function of the battery may be paralyzed by energizing the aforesaid electric actuator and the aforesaid steering angle limiting value is made zero so that no provision of steering angles to the rear wheels is performed at all. Then, in a case where the voltage of the battery is between 8 V and 12 V, the aforesaid steering angle limiting value is varied continuously (in the case represented in FIG. 15) or at steps (in the case represented in FIG. 16).

In this respect, the electric four-wheel steering apparatus of the present invention is applicable to any types of structure if only the steering angles are given to the rear wheels on the basis of the energizing of an electric motor. In other words, an electric four-wheel steering apparatus to which the present invention is not necessarily of the type having the compliance steering mechanism incorporated.

The electric four-wheel steering apparatus of the present invention is structured and operated as described above. Therefore, there is no possibility that the driving of the vehicle is impaired or the rear wheels remain in such a state that the provision of the steering angle thereto is maintained due to the complete consumption of the battery.

What is claimed is:

1. A four-wheel steering apparatus comprising:

a front wheel steering sensor for detecting steering angles given to front wheels;

a vehicle speed sensor for detecting vehicle speeds;

a rear wheel output shaft for giving steering angles to rear wheels by being displaced in an axial direction;

a centering spring having a resiliency enabling the rear wheel output shaft to be returned to a neutral position;

an electric motor for causing said rear wheel output shaft to be displaced in the axial direction against the resiliency of the centering spring; and a controller for controlling the energizing of said electric motor based on signals from said front wheel steering sensor and said vehicle speed sensor, said controller adjusting the output torque of said electric motor based on the signals from said front wheel steering sensor and said vehicle speed sensor to control displacement of said rear wheel output shaft by open loop control of said electric motor independently of the rear wheel steering angle.

2. A four-wheel steering apparatus according to claim 1 wherein the spring characteristics of said centering spring are made to be of a non-linear type, and the spring constant is defined to be large in the region where an amount of resilient deformation of said centering spring is small and the spring constant is defined to be small in an region where the amount of resilient deformation thereof is large.

3. A four-wheel steering apparatus according to claim 1, further comprising a displacement sensor for detecting displacement of said rear wheel output shaft, and wherein said controller effects a fail-safe function depending upon deviation of the detected displacement from a target value.

4. An electric four-wheel steering apparatus comprising:

a front wheel steering sensor for detecting steering angles given to front wheels;

a controller for calculating steering angles to be given to rear wheels based on signals transmitted from said front wheel steering sensor, and outputting instruction signals in accordance with the calculated steering angles;

an electrical actuator for providing steering angles to the rear wheels in accordance with the instruction signals; and a vehicle speed sensor for detecting vehicle speeds and outputting vehicle speed detection signals to said controller, said controller having a function to suspend the provision of steering angles to said rear wheels by said electrical actuator, irrespective of the steering angles is detected by said front wheel steering sensor, if it is determined from said vehicle speed detection signals that said vehicle is at rest, and said controller having the further function to cause said electrical actuator to provide said rear wheels with the calculated steering angles at reduced initial rate when it is determined from said vehicle speed detection signals that the vehicle has resumed traveling subsequent to the suspension of the provision of steering angles by said controller.

5. An electric four-wheel steering apparatus comprising:

a front wheel steering sensor for detecting steering angles given to front wheels;

a controller for calculating steering angles to be given to rear wheels based on signals transmitted from said front wheel steering sensor, and outputting instruction signals in accordance with the calculated steering angles;

an electrical actuator for providing steering angles to the rear wheels in accordance with the instruction signals;

a battery for energizing said electrical actuator and source voltage detecting means for detecting the voltage of said battery and outputting voltage detection signals to said controller, said controller having a function for causing said electrical actuator to provide a rear wheel steering angle which is lower than a calculated rear wheel steering angle when said source voltage detector detects that said battery voltage is lower than a required voltage for the calculated steering angle but more than a predetermined threshold voltage, and for disabling the provision of a rear wheel steering angle when said source voltage detector detects that said battery voltage is lower than said predetermined threshold voltage.

\* \* \* \* \*